United States Patent [19]

Ikeda et al.

[11] Patent Number: 5,539,004
[45] Date of Patent: Jul. 23, 1996

[54] PROCESS FOR RECYCLING RESIN SCRAP AND APPARATUS THEREFOR

[75] Inventors: Sadao Ikeda, Toyota; Makoto Kito, Aichi-ken; Yoshio Taguchi, Nagoya; Atsushi Tanaka, Aichi-ken; Shigeki Inoue, Hiroshima; Naoyuki Murata, Hiroshima; Shinichi Ninomiya, Hiroshima; Yoshitaka Kimura, Hiroshima, all of Japan

[73] Assignees: Toyota Jidosha Kabushiki Kaisha; The Japan Steel Works, Ltd.; Kabushiki Kaisha Toyota Chuo Kenkyusho, all of, Japan

[21] Appl. No.: 330,524

[22] Filed: Oct. 28, 1994

[30] Foreign Application Priority Data

Oct. 29, 1993 [JP] Japan ............................. 5-272662

[51] Int. Cl.⁶ .................................................. C08J 11/04
[52] U.S. Cl. ........................ 521/45; 521/40; 521/40.5; 521/48; 521/49; 523/326; 523/328; 422/184.1; 428/903.3; 264/37
[58] Field of Search ..................... 521/40, 40.5, 45, 521/48, 49; 422/184, 176; 523/326, 328; 428/903.3; 264/37

[56] References Cited

U.S. PATENT DOCUMENTS

| | | | |
|---|---|---|---|
| 4,051,212 | 9/1977 | Grigat et al. | 264/102 |
| 4,324,705 | 4/1982 | Seto et al. | 521/45 |
| 5,286,424 | 2/1994 | Su et al. | 521/46 |
| 5,414,021 | 5/1995 | Eddy | 521/40 |

FOREIGN PATENT DOCUMENTS

| | | |
|---|---|---|
| 0547249 | 6/1993 | European Pat. Off. . |
| 0584501 | 3/1994 | European Pat. Off. . |
| 4230572 | 3/1994 | Germany . |
| 5-801232 | 1/1993 | Japan . |
| 5-200749 | 8/1993 | Japan . |
| 94/23931 | 10/1994 | WIPO . |

OTHER PUBLICATIONS

"Twin Screw Extrusion: Technology and Principles", James L. White, Carl Hanser Verlag, 1991, ISBN 4–915666–16–6–C3043, pp. 248–264.
"Verschmutzte Kunststoffabfalle werden zu wachsartigen Substanzen", Prof. Dr. G. Menges and V. Lackner, vol. 82, No. 2, Feb. 1992, pp. 106–109.
European Search Report (3 pages) dated Feb. 3, 1995
Communication (1 page) dated Feb. 10, 1995.
"Aufbereitung von thermoplastischen Abfallen uber die Schmelze", Helmut Tenner, Speyer/Rein, vol. 31, No. 5, May 1980, pp. 252–258.
Abstract —DATABASE WPI, Section Ch, Week 9404, Derwent Publications Ltd., London, GB; Class AC, An 94–031297 C04!; JP-A-5 337 940 (MITSUBISHI PETROCHEMICAL CO. LTD.) 21 Dec. 1993.
Abstract —DATABASE WPI, Section Ch, Week 9245, Derwent Publications Ltd., London, GB; Class AC, An 92–372218 C45!; SU-A-1 698 074 (KHARK MASHPRIBORPLASTIK DES. BUR.) 15 Dec. 1991.

*Primary Examiner*—Paul R. Michl
*Assistant Examiner*—Olga Asinovsky
*Attorney, Agent, or Firm*—Finnegan, Henderson, Farabow, Garrett & Dunner

[57] ABSTRACT

A process and an apparatus for recycling resin scrap including a thermosetting resin paint film and a thermoplastic resin substrate as its major components, wherein the resin scrap is supplied into a passage of a cylinder, melted, and delivered by delivering means from an upstream side to a downstream side of the passage of the cylinder, and hydrolyzed by a hydrolyzing agent while forming a highly packed region with a resistor. The resistor restricts the resin scrap to flow from the upstream side to the downstream side in a short period of time, and forms the highly packed region where a contact efficiency is enhanced between the resin scrap and the hydrolyzing agent.

11 Claims, 12 Drawing Sheets

PROCESS FOR RECYCLING RESIN SCRAP AND APPARATUS THEREFOR

BACKGROUND OF THE INVENTION

1. Field of the Invention

The present invention relates to a process for recycling resin scrap and an apparatus therefor. In particular, it is applicable to recycling resin scrap with paint film coated, for instance, recycling vehicle bumpers.

2. Description of the Related Art

It has been required recently to recycle and re-use resin scrap. When the resin scrap comprises thermosetting resin and thermoplastic resin, for instance, when it comprises a thermoplastic resin substrate and a thermosetting resin paint film laminated on the substrate, the thermoplastic resin melts, but the thermosetting resin does not melt nor dissolve in a solvent. Accordingly, it is difficult to recycle such resin scrap. This results from the fact that thermosetting resin is cross-linked three-dimensionally therein by thermal setting.

Accordingly, there has been proposed recently a recycling process for the rein scrap which comprises a thermoplastic resin substrate and a thermosetting resin paint film laminated on the substrate. In the recycling process, the resin scrap is Finely pulverized, and the finely pulverized resin scrap is kneaded as it is with a kneader, thereby producing recycled resin composition. However, by the recycling process, the paint film cannot be fined, and cannot be melted in the kneader. As a result, the paint film comes to exist as a foreign material in the recycled resin composition. Therefore, molded products made from the recycled resin composition comes to exhibit degraded mechanical characteristics. The degraded mechanical characteristics arise sharply in impact strength. For example, when vehicle bumpers are made from the recycled resin composition, they exhibit much more deteriorated collision resistance in cold areas than those made from virgin material. Hence, there arises a problem in that the recycled resin composition can be used limitedly in minor applications only in which impact strength is not required.

Hence, the applicants of the present invention developed a new recycling process for producing recycled resin composition which is disclosed in Japanese Re-laid-open Patent Publication No. 5-801,232 based upon a PCT application. In the recycling process, resin scrap with a thermosetting resin polyurethane paint film or an amino resin paint film laminated is pulverized, and the pulverized resin scrap is hydrolyzed by heating and melting under a pressure of 35 kgf/cm$^2$ at a temperature of up to 220° C., thereby producing recycled resin composition. By the recycling process, the thermosetting resin constituting the paint film can be easily converted into low-molecular-weight compounds by the hydrolysis with the highly heated and pressurized water. After the hydrolysis, the paint film can be fined into pieces by melting and kneading the resin scrap, and the resulting fined paint film pieces can be dispersed in the recycled resin composition further uniformly. Thus, the paint film do not act as foreign material. Hence, the recycling process can advantageously give the sufficient mechanical strength to the recycled resin composition. It has been verified by infrared spectroscopy and liquid chromatography that the paint film is converted into the low-molecular-weight compounds by the hydrolysis.

In addition, as set forth in Japanese Unexamined Patent Publication (KOKAI) No. 5-200,749, another recycling process has been known. In the other recycling process, resin scrap is supplied to a kneader together with a decomposition facilitating agent, such as Lewis acid like tin chloride, alkali metal hydroxide, alkaline-earth metal hydroxide, amine and metal phosphate, it is melted and kneaded at a temperature of 200° C. or more, and thermosetting resin is fined by thermal decomposition so as to disperse in recycled resin composition. According to the recycling process, the decomposition facilitating agent is added in an amount of from 0.01 to 1% by weight with respect to the resin scrap. This recycling process, however, does not utilize hydrolysis in order to recycle the resin scrap.

SUMMARY OF THE INVENTION

The present invention has been developed as a part of the above-described new recycling process in which thermosetting resin is converted into low-molecular-weight compounds by hydrolysis in order to produce recycled resin composition. It is therefore an object of the present invention to provide a process for recycling resin scrap and an apparatus therefor which can reduce time required for recycling and which can contribute to highly refining recycled resin composition. In order to achieve the object, the present inventors have devised a way of improving a contact efficiency between resin material and a hydrolyzing agent in a cylinder, and thereby successfully completed to effectively carry out the conversion of the thermosetting resin into the low-molecular-weight compounds by hydrolysis.

A process for recycling resin scrap and an apparatus therefor according to the present invention can accomplish the aforementioned object. In a first aspect of the present invention, the process uses:

resin material, the resin material comprising scrap including thermosetting resin and thermoplastic resin as its major components; and an apparatus having an upstream side and a downstream side, and the apparatus comprising:

a cylinder including a passage, at least part of the passage defining a hydrolysis region; and means for delivering the resin material from the upstream side to the downstream side, the delivering means disposed in the passage and including a resistor disposed therein so as to restrict the delivery of the resin material to the downstream side in the hydrolysis region, thereby forming a highly packed region where a packing efficiency of the resin material is enhanced on an upstream side with respect to the resistor; and the process comprises the steps of:

melting the thermoplastic resin of the resin material while delivering the resin material, having been supplied to the passage of the cylinder, from the upstream side to the downstream side;

hydrolyzing the thermosetting resin by contacting the resin material, undergone the melting step, with a hydrolyzing agent; and degassing by vaporizing water content resulting from the thermosetting resin undergone the hydrolyzing step;

whereby improving a contact efficiency between the resin material and the hydrolyzing agent in the hydrolyzing step.

In a second aspect of the present invention, the resin material is hydrolyzed under a pressure of from 10 to 100 kgf/cm$^2$ at a temperature of the resin material from 180° to 280° C., preferably under a pressure of from 20 to 50 kgf/cm$^2$ at a temperature of the resin material from 200° to 250° C.

In a third aspect of the present invention, the apparatus includes a plurality of the resistors which are disposed at predetermined intervals in series, and the cylinder which includes a plurality of supply ports, disposed on an upstream side with respect to each of the resistors, for supplying the hydrolyzing agent to the passage, thereby supplying the hydrolyzing agent to the passage through each of the supply ports.

In a fourth aspect of the present invention, the hydrolyzing agent is supplied in a larger amount to the passage through the supply ports which are disposed on the upstream side of the passage than through the supply ports which are disposed on the downstream side of the passage.

In a fifth aspect of the present invention, the hydrolyzing step includes a step of selecting water as the hydrolyzing agent, and the water is added in an amount of from 5 to 40 parts by weight, preferably in an amount of from 7 to 40 parts by weight, further preferably in an amount of from 7 to 25 parts by weight, with respect to 100 parts by weight of the resin material.

In a sixth aspect of the present invention, the apparatus has an upstream side and a downstream side and comprises:

a cylinder having opposite ends and an intermediate portion, the cylinder including an inlet port for supplying resin material, comprising thermosetting resin and thermoplastic resin, disposed at one end, an outlet port for discharging recycled resin composition disposed at the other end, a passage connecting the inlet port and the outlet port, a supply port for supplying a hydrolyzing agent to the passage disposed at the intermediate portion, and degassing means disposed downstream with respect to the supply port; and delivering means disposed in the passage of the cylinder, and including a plurality of delivering members, kneading members and resistors;

thereby defining a melting region, a hydrolyzing region, and a degassing region in the passage of the cylinder in this order from the upstream side to the downstream side.

In a seventh aspect of the present invention, the resistors are constituted by at least one member selected from the group consisting of a sealing ring and a reverse-feed full-flighter, the delivering means are constituted mainly by a forward-feed full-flighter, and the kneading means are constituted by at least one member selected from the group consisting of a forward-feed kneading disk, a reverse-feed kneading disk, an orthogonal kneading disk and a gear kneader.

In an eighth aspect of the present invention, crack producing means for producing cracks in the thermosetting resin of the resin material is further disposed on an upstream side with respect to the melting region.

In a ninth aspect of the present invention, washing means for washing the resin material is further disposed on an upstream side with respect to the melting region.

In a tenth aspect of the present invention, the resistors are constituted by a rotary member which has an outer peripheral portion, which is disposed in the passage substantially coaxially therewith and which has a plurality of grooves lined up in the outer peripheral portion in a circumferential direction, and the hydrolyzing agent supply port is disposed so as to be capable of facing the grooves.

The hydrolyzing agent employed by the present invention can be represented by water (e.g., cold water and hot water), and water vapor. Further, it is possible to employ water with alcohol added, and water with hydrolysis-facilitating acid and alkali added for the hydrolyzing agent. As for the alcohol, it is possible to utilize hydrophilic alcohol, such as methanol, ethanol, propanol, ethylene glycol, methyl cellosolve (Trade Mark), and ethyl cellosolve (Trade Mark). As for the acid, it is possible to employ inorganic acid, such as hydrochloric acid and sulfuric acid, and organic acid, such as acetic acid, oxalic acid and tartaric acid. As for the alkali, it is possible to use inorganic base, such as sodium hydroxide and potassium hydroxide, and organic base such as sodium methoxide. Depending on the types of the resin scrap and the applications of the recycled product, the hydrolyzing agent is constituted by appropriately selecting these substances.

The resin scrap used by the present invention includes thermosetting resin and thermoplastic resin as its major components. For instance, a thermosetting resin paint film is usually laminated on a thermoplastic resin substrate. As for the paint film, it is possible to employ acrylics-melamine resin, alkyd-melamine resin and polyurethane resin. For example, it is possible to employ a paint film which is formed of a major component, such as alkyd resin, polyester resin and alkyl resin, and a curing agent, such as amino resin (e.g., melamine resin). These paint films are hydrolyzed under highly heated and pressurized condition, and their three-dimensionally cross-linked construction is destroyed, thereby being converted into low-molecular-weight compounds.

As for the thermoplastic resin, any resin can be used as far as it has thermoplasticity. For instance, it is possible to name polypropylene, polypropylene modified with elastomer, polyethylene, ABS resin, AS resin, polyamide resin, polyester resin, polycarbonate resin and polyacetal resin for the thermoplastic resin. In addition, it is not preferable to use resin which is susceptible to the hydrolyzing condition for the thermoplastic resin.

In the first aspect of the present invention, the resistor is disposed in the delivering means, and restricts the delivery of the resin material to the downstream side in the hydrolysis region, thereby forming a highly packed region where a packing efficiency of the resin material is enhanced on an upstream side with respect to the resistor. As a result, the hydrolyzing agent can be inhibited from going fast to the downstream side of the cylinder. With this arrangement, the hydrolyzing agent can reside in the hydrolysis region for a prolonged period of time, thereby improving a contact efficiency between the resin material and the hydrolyzing agent in the hydrolysis region and facilitating the hydrolysis of the thermosetting resin.

The resistor can be constituted by a sealing ring, a reverse-feed full-flighter, or the combinations of a sealing ring and a reverse-feed full-flighter. The sealing ring seals the passage to reduce a flow passage area through which the resin material passes. The reverse-feed full-flighter adjusts the helical direction of screw so as to reversely feed the resin material.

In the case where the hydrolysis agent is water, the form of water in the hydrolysis region depends basically on the pressure and temperature in the hydrolysis region. Hence, the water can be liquid water, water vapor, or coexistence of the liquid water and the water vapor. In particular, when the vapor pressure in the hydrolysis resin is kept at the saturation vapor pressure or more, the liquid water and the water vapor are believed to coexist.

As having been described so far, in accordance with the first aspect of the present invention, there is formed the highly packed region where a packing efficiency of the resin material is enhanced on an upstream side with respect to the resistor. Accordingly, the hydrolyzing agent can be inhibited from going fast to the downstream side of the cylinder. As a result, in the hydrolysis region, the contact efficiency can be improved between the hydrolyzing agent and the resin material, and the hydrolysis of the thermosetting resin can be facilitated. In addition, the highly packed region also enhances the sealing property. Hence, it is possible to keep the pressure in the hydrolysis region high, and to advantageously raise the temperature in the hydrolysis region. Thus, the first aspect of the present invention can contribute to reducing the recycling time and highly refining recycled resin composition. Concerning its advantageous effect to recycling apparatus, it can reduce the length of the hydrolysis region in the recycling apparatus, and can advantageously down-size the recycling apparatus.

In accordance with the second aspect of the present invention, the hydrolysis can be carried out under a pressure of from 10 to 100 kgf/cm$^2$, and the temperature of the resin material can be raised to a temperature of from 180° to 280° C. Hence, the hydrolysis reaction can be facilitated, and the length of the hydrolysis region can be reduced. Thus, the second aspect of the present invention can further advantageously down-size the present recycling apparatus.

In accordance with the third aspect of the present invention, a plurality of the resistors are disposed at predetermined intervals in series in the passage of the cylinder, and the cylinder includes a plurality of supply ports, disposed on an upstream side with respect to each of the resistors, for supplying the hydrolyzing agent to the passage. Therefore, the hydrolyzing agent is supplied to the passage through each of the supply ports. As a result, the hydrolyzing agent can be dispersed efficiently in the hydrolysis region to improve the efficiency of the hydrolysis reaction. Thus, the third aspect of the present invention can further improve the efficiency of the hydrolysis reaction.

In accordance with the fourth aspect of the present invention, the hydrolyzing agent is supplied in a larger amount to the passage through the supply ports which are disposed on the upstream side of the passage than through the supply ports which are disposed on the downstream side of the passage. With this arrangement, the resin material placed on the upstream side can be prevented from thermally degrading, though such resin material is likely to be overheated because of its high viscosity and large shearing friction. Thus, the fourth aspect of the present invention can further advantageously refine recycled resin composition.

In accordance with the fifth aspect of the present invention, the hydrolyzing agent is water. The water is added in an amount of from 5 to 40 parts by weight with respect to 100 parts by weight of the resin material. It should be noted that the water is supplied more than the amount required for the hydrolysis. Therefore, the resin material can be inhibited from thermally degrading excessively. Thus, the fifth aspect of the present invention can also further advantageously refine recycled resin composition.

The apparatus according to the sixth aspect of the present invention can carry out the present recycling process.

In accordance with the seventh aspect of the present invention, the reverse-feed full-flighter has a less capability than the forward-feed full-flighter in terms of the resin material delivery. The sealing exhibits resistance against the resin material delivery. By using these members for the present resistor, it is possible to adjust the residing time of the resin material in the passage, and to effectively secure the hydrolysis reaction time. In addition, the kneading disks and a gear kneader can produce a highly dispersed state during kneading. By using these members for the present resistor, the hydrolyzing agent can be highly dispersed. Thus, the seventh aspect of the present invention can effectively disperse the hydrolyzing agent in and mix it with the resin material, and accordingly can further satisfactorily carry out the hydrolysis reaction.

In accordance with the eighth aspect of the present invention, since the crack producing means for producing cracks in the thermosetting resin of the resin material is further disposed on an upstream side with respect to the melting region, the thermosetting resin is likely to break into pieces. Therefore, the surface area of the thermosetting resin can be increased to facilitate the hydrolysis reaction. Thus, the eighth aspect of the present invention can improve the contact efficiency between the hydrolyzing agent and the resin material, and can further advantageously refine recycled resin composition.

In accordance with the ninth aspect of the present invention, since the washing means for washing the resin material is further disposed on an upstream side with respect to the melting region, the foreign materials, such as dirt and tar, can be separated from the resin material. Hence, the foreign materials can be inhibited from mingling, and simultaneously the thermosetting resin is likely to be hydrolyzed. Thus, the ninth aspect of the present invention can further advantageously refine recycled resin composition.

In accordance with the tenth aspect of the present invention, since the resistors are constituted by a rotary member which has an outer peripheral portion, and which has a plurality of grooves lined up in the outer peripheral portion in a circumferential direction, and since the hydrolyzing agent supplying port is disposed so as to face the grooves, the hydrolyzing agent is spread finely as the rotary member rotates. Therefore, the contact efficiency between the resin material and the hydrolyzing agent can be further improved. Thus, the tenth aspect of the present invention can further facilitate the hydrolysis of the thermosetting resin, and can further advantageously refine recycled resin composition.

BRIEF DESCRIPTION OF THE DRAWINGS

A more complete appreciation of the present invention and many of its advantages will be readily obtained as the same becomes better understood by reference to the following detailed description when considered in connection with the accompanying drawings and detailed specification, all of which forms a part of the disclosure.

DETAILED DESCRIPTION OF THE PREFERRED EMBODIMENTS

Having generally described the present invention, a further understanding can be obtained by reference to the specific preferred embodiments which are provided herein for purposes of illustration only and are not intended to limit the scope of the appended claims.

The preferred embodiments will be hereinafter described with reference to the accompanied drawings.

First Preferred Embodiment

Recycling Apparatus and Resin Scrap

Figure 1:
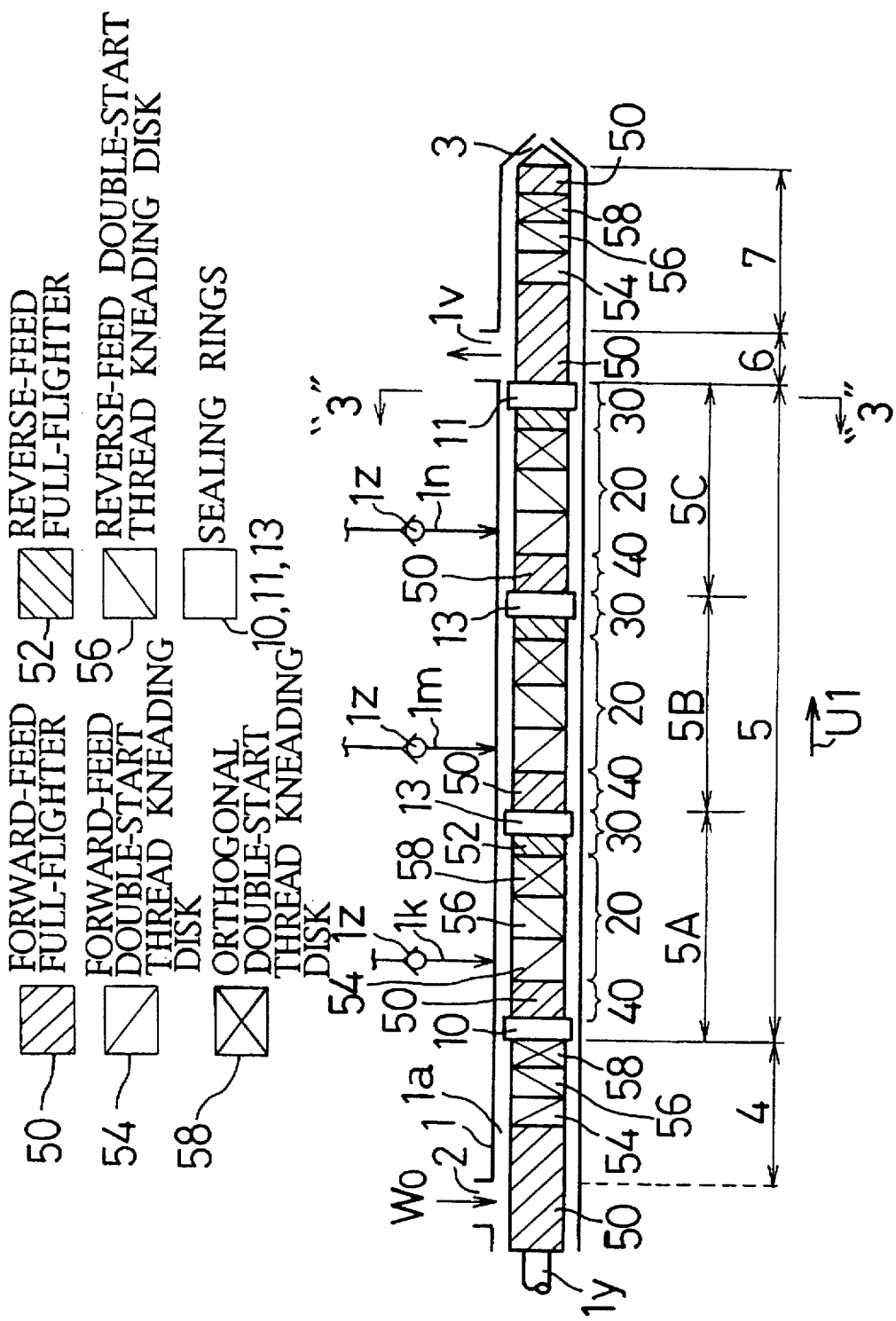
FIG. 1 is a construction diagram which schematically illustrates a recycling apparatus of a First Preferred Embodiment according to the present invention.
Figure 2:
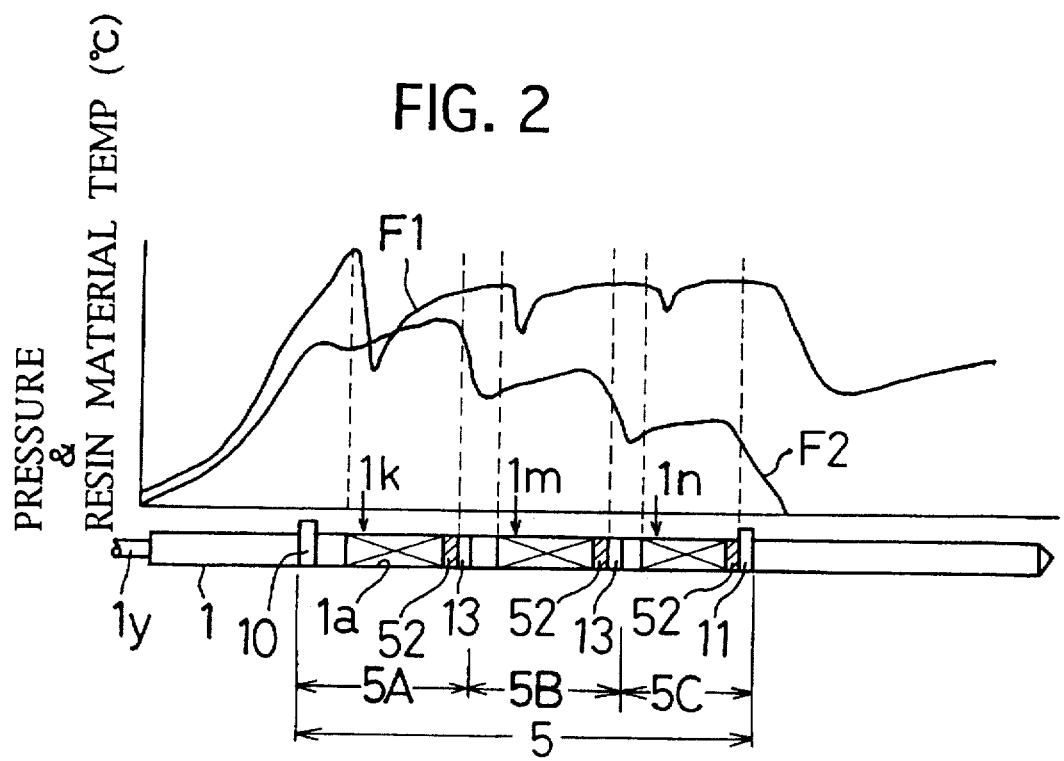
FIG. 2 is a graph which illustrates a temperature characteristic and a pressure characteristic along with a longitudinal axis of a cylinder of the recycling apparatus illustrated in FIG. 1.
Figure 3:
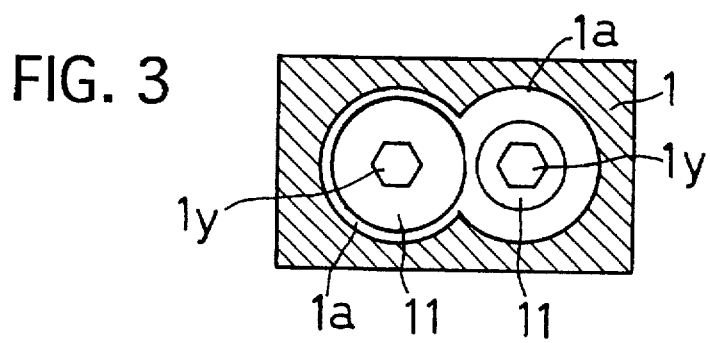
FIG. 3 is a cross-sectional view of the recycling apparatus taken along the arrows "3"—"3" of FIG. 1.

FIG. 1 schematically illustrates a recycling apparatus employed by the First Preferred Embodiment together with its screw arrays arrangement. FIG. 2 illustrates the temperature characteristic of resin material employed by the First Preferred Embodiment. FIG. 3 schematically illustrates a transverse cross-sectional view of the recycling apparatus taken along the arrows "3"—"3" of FIG. 1. In the First Preferred Embodiment, a double-axis screw extrusion apparatus, e.g., Type "TEX44" made by THE JAPAN STEEL WORKS, Ltd., is employed for the recycling apparatus. The double-axis screw extrusion apparatus is a uni-direction rotary type, and includes two screw arrays whose screw outside diameter is 44 mm, which are disposed parallelly, and which rotate in the same direction.

The recycling apparatus comprises a cylinder 1 including a passage 1a, a supply port 2 formed at an end of the passage 1a of the cylinder 1 for supplying resin material resulting from scrap, a discharge port 3 formed at the other end of the passage 1a of the cylinder 1 for discharging recycled resin composition, and a plurality of water supply ports (e.g., a first water supply port 1k, a second water supply port 1m and a third water supply port 1n) for supplying water in the passage 1a of the cylinder 1. The first, second and third water supply ports 1k, 1m and 1n are provided with a check valve 1z.

In the passage 1a of the cylinder 1, there are defined a melting region 4, a hydrolysis region 5, a degassing region 6 and a kneading region 7 in series in this order from the upstream side to the downstream side of the screw arrays constituting the present delivering means, e.g., in the direction of the arrow U1 from the supply port 2 to the discharge port 3. As illustrated in FIG. 1, there are disposed full-flighter screws (hereinafter simply referred to as "full-flighters") 50 and 52, kneading disks 54, 56 and 58, and so on around a driving shaft 1y in series in a predetermined combination. When the driving shaft 1y rotates, these members rotate. Immediately below the supply port 2, there is disposed the forward-feed full-flighter 50 which has a large delivery capability.

In the First Preferred Embodiment, pulverized products $W_o$ are employed as the resin material, and are made by pulverizing vehicle bumpers (i.e., resin scrap with paint film) with a pulverizer, and have a square shape in a size of about 5 mm×5 mm. In the resin scrap made up of the pulverized products $W_o$, an acrylics-melamine resin pain film is laminated on an exposed surface of a thermoplastic polypropylene substrate. The pulverized products $W_o$ were supplied through the supply port 2 into the passage 1*a* in an amount of 50 kg per hour.

In the First Preferred Embodiment, water for carrying out hydrolysis is supplied through the first, second and third water supply 1*k*, 1*m* and 1*n* into the passage 1*a*. The water is supplied in an amount of 10 parts by weight in total with respect to 100 parts by weight of the resin material. In the First Preferred Embodiment, the water is supplied in an amount more than required for hydrolyzing the resin material. Accordingly, despite the shearing heat generation action of the screw arrays, the resin material can be inhibited from excessively generating heat. Thus, the resin material, especially the thermoplastic resin substrate, can be kept from degrading.

Concerning the relationship between the water supply amounts per unit time through the first, second and third water supply ports 1*k*, 1*m* and 1*n*, it is possible to adjust as follows:

---
(the water supply amount through
the first water supply port 1k) >
(the water supply amount through
the second water supply port 1m) >
(the water supply amount through
the third water supply port 1n).
---

For example, the ratio of the water supply amounts can be determined as follows:

---
(the water supply amount through
the first water supply port 1k):
(the water supply amount through
the second water supply port 1m):
(the water supply amount through
the third water supply port 1n): =          5:3:2.
---

Since the resin material is kneaded under high shearing stress in the melting region 4 on the upstream side, it is heated to high temperatures when it flows into the hydrolysis region 5. Hence, the temperature of the resin material should be adjusted to temperatures appropriate for hydrolysis (e.g., temperatures not causing the thermal degradation of resin material). Further, the ratio is determined as described above in order to inhibit the temperature of the resin material from lowering sharply, to keep it appropriate for hydrolysis, and to effectively carry out hydrolysis.

The screw arrays disposed in the aforementioned regions and their actions will be hereinafter described in detail for each of the steps of the present recycling process.

Melting Step

In the First Preferred Embodiment, the screw arrays are constituted by combining double-start thread kneading disks 54, 56 and 58 in the melting region 4 as illustrated in FIG. 1. In the melting step, the resin material is heated by the shearing friction resulting from the rotation of the screw arrays and by a heater built in the cylinder 1. During the heating, the paint film deposited on the surface of the resin material is pulverized mechanically into pieces by the shearing friction resulting from the rotation of the kneading disks 54, 56 and 58, and its surface area increases. As a result, a contact efficiency can be improved between the paint film pieces and the water or the water vapor. The thus pulverized paint film pieces are dispersed in the molten resin material, and are delivered to the downstream side, i.e., to the hydrolysis region 5.

Hydrolyzing Step

In the hydrolysis region 5 of the cylinder 1, there are disposed sealing rings 10 and 11, working as the present resistors, on the downstream side and the upstream side, respectively, thereby enhancing the sealing property. Accordingly, the pressure in the hydrolysis region 5 is maintained at high pressures, e.g., from 10 to 100 kgf/cm$^2$. Since the pressure is kept thus high, the temperature of the resin material can be maintained at temperatures, e.g., from 180° to 280° C., higher than those produced by the prior art. As a result, the hydrolysis can be carried out at higher temperatures than it is done by the prior art, the hydrolysis reaction can be facilitated and accomplished effectively, and the hydrolysis reaction time can be reduced.

The hydrolysis region 5 includes three regions 5A, 5B and 5C. In the hydrolysis region 5A, a screw array 20 is constituted by combining a forward-feed double-start thread kneading disk 54 disposed below the first water supply port 1*k*, a reverse-feed double-start thread kneading disk 56 and an orthogonal double-start thread kneading disk 58.

There is also disposed a screw array 30 in the hydrolysis region 5A. The screw array 30 is constituted by combining a reverse-feed full-flighter 52 disposed on an upstream side and a sealing ring 13 disposed on a downstream side. The sealing ring 13 constituting the screw array 30 operates as the present resistor for restricting the delivery of the resin material to the downstream side. Likewise, the reverse-feed full-flighter 52 constituting the screw array 30 has a capability of delivering the resin material to the upstream side, and consequently operates as the present resistor. With this arrangement, the resin material is likely to be packed in the space between the screw array 30 and the screw array 20. Accordingly, in the space between the screw array 30 and the screw array 20, there is formed a highly packed region where a packing efficiency of the resin material is enhanced. For instance, it is believed that the packing efficiency would fall in a range of approximately from 70 to 100%. In particular, it is believed that the packing efficiency would be about 30% at the forward-feed full-flighter 50 having a large capability of delivering the resin material.

With the thus formed highly packed region, the hydrolysis region 5 can be enhanced in terms of the sealing property, and the pressure therein can be maintained at high pressures. For example, when the resin material was delivered in the amount of 50 kg per hour, the pressure was 50 to 60 kgf/cm$^2$ around the first water supply port 1*k* in the passage 1*a*.

Further, there are repetitively disposed the screw arrays 20 and 30, which can form a highly packed region where a packing efficiency of the resin material is enhanced, in series as illustrated in FIG. 1. In other words, the same screw arrays 20 and 30 are constituted by combining the identical component members, and are similarly disposed in the hydrolysis regions 5B and 5C, respectively. Furthermore, there are disposed forward-feed full-flighters 50 (i.e., screw arrays 40), which have a high delivering capability and work as the present delivering means, on the upstream sides with respect to the screw arrays 20 and 30. Hence, the recycling apparatus is securely provided with an ability of delivering the resin material to the downstream side.

Those members, like the reverse-feed full-flighter 52, having little delivering ability can operate so as to let the resin material reside in the hydrolysis region 5 for an extended period of time. Therefore, they can securely and advantageously provide the hydrolysis time.

In the First Preferred Embodiment, as can be appreciated from FIG. 1, the water is supplied through the first water supply port 1k, the second water supply port 1m and the third water supply port 1n into the hydrolysis region 5. The supplied water is dispersed in the molten resin material by the action of the screw arrays 20 and 30. Consequently, the fine paint film pieces dispersed in the resin material contact effectively with the liquid water or the water vapor to efficiently cause hydrolysis. The fine paint film pieces can be converted into low-molecular-weight compounds because their molecular chains are out by the kneading action of the screw arrays 20 and 30. Hence, the paint film pieces from the melting region 4 can be further subdivided in the hydrolysis region 5.

When the pressure is kept at the saturation vapor pressure or more in the hydrolysis region 5, the water is present in the resin material in a form of the liquid water and the water vapor. When the pressure is maintained at pressures less than the saturation vapor pressure in the cylinder 1, the water heated to high temperatures is believed to exist in the resin material in a form of the water vapor if there is ample time left for the water to vaporize.

In the First Preferred Embodiment, as can be seen from FIG. 1, the water is supplied through the first water supply port 1k into the hydrolysis region 5A, through the second water supply port 1m into the hydrolysis region 5B, and through the third water supply port 1n into the hydrolysis region 5C. Thus, the water supply ports are provided in the same quantity as that of the highly packed regions. With this arrangement, the hydrolysis can be carried out effectively, and simultaneously the resin material can be inhibited from being excessively heated. In addition, the first water supply port 1k is disposed on an upstream side of the hydrolysis region 5A, the second water supply port 1m is disposed on an upstream side of the hydrolysis region 5B, and the third water supply port 1n is disposed on an upstream side of the hydrolysis region 5C. The reasons behind this arrangement are to down-size the cylinder 1 in the longitudinal axis direction, and at the same time to securely enlarge the length of the hydrolysis regions 5A, 5B and 5C over which the hydrolysis carried out.

Degassing Step

In the degassing region 6 of the cylinder 1, the water supplied through the first, second and third water supply ports 1k, 1m and 1n is discharged through a vent hole 1v to the outside of the cylinder 1. In the degassing step, the pressure in the cylinder 1 is virtually the atmospheric pressure because it is released to the atmosphere, and the water is discharged as the water vapor through the vent hole 1v. The decomposed components of the resin material are partially discharged together with the water vapor. This phenomenon can be verified by conducting an experiment in which resin material free from paint film is hydrolyzed. In the First Preferred Embodiment, the discharge was slightly white. However, in the experiment, the discharge was colorless.

Kneading Step

In the kneading step, the temperature of the cylinder 1 is adjusted to the melting point of the resin material or less in the kneading region 7. The thus decreased temperature increases the viscosity of the rein material, and accordingly enlarges the shearing force resulting from the screw arrays. Accordingly, the paint film pieces can be subjected to enlarged mechanical cracking force, and can be converted into low-molecular-weight compounds. Thus, the paint film pieces can be further subdivided advantageously. In the kneading region 7, as illustrated in FIG. 1, the screw array is constituted by a forward-feed full-flighter 50, a forward-feed double-start thread kneading disk 54, a reverse-feed double-start thread kneading disk 56, an orthogonal double-start thread kneading disk 58 and a forward-feed full-flighter 50 which are disposed in this order.

The thus produced recycled resin composition is discharged cut of a die, which is disposed in the discharge port 3 of the cylinder 1, through a screen mesh, and formed as a shape of 4 mm-diameter rods. In order to pelletize the recycled resin composition, the rods are cooled with water, and cut to approximately 3 mm in length by a strand cutter (not shown). In accordance with the First Preferred Embodiment, the time required for recycling (or the residing time) was about from 2 to 3 minutes. Thus, the recycling time was reduced sharply compared to that of the prior art.

FIG. 2 schematically illustrates temperature distribution of the resin material in the passage 1a of the cylinder 1 with the characteristic curve F1. As described above, the water is supplied through the first, second and third water supply ports 1k, 1m and 1n into the passage 1a, and accordingly the temperature drops around the first, second and third water supply ports 1k, 1m and 1n as illustrated by the characteristic curve F1. The pressure in the passage 1a is illustrated by the characteristic curve F2. In the degassing region 6, the pressure is substantially the atmospheric pressure because the degassing region 6 communicates with the external atmosphere by way of the vent hole 1v. Basically, the term "pressure" herein means the sum of the water vapor pressure and the pressure of the resin material associated with the delivery. Therefore, in the region where the resin material packing efficiency is low, for instance, at the forward-feed full-flighters 50 having a high delivering ability, the ratio of the pressure of the resin material associated with the delivery is believed to be low. On the other hand, in the region where the resin material packing efficiency is high, for instance, at the screw arrays 30 which include the sealing rings 11 and 13 restricting the delivery of the resin material to the downstream side, the ratio of the pressure of resin material associated with the delivery is believed to be high.

Screw Configuration

Concerning the arrangements of the screws employed by the above-described First Preferred Embodiment, for instance, the helix angle (or lead), pitch and number of starts of the screws, they can be determined depending on applications. FIG. 26 illustrates examples of the screw arrangement. FIG. 26 (A) and (B) illustrate an example of the forward-feed full-flighter 50. FIG. 26 (C) and (D) illustrate an example of the reverse-feed full-flighter 52. In FIG. 26 (B) and (D), though the inner wall surface of the passage 1a of the cylinder 1 is formed in a circle with substantial roundness, it is abbreviated virtually. The forward-feed full-flighter 50 is adjusted in terms of the helical direction of screw 50i so as to securely produce the ability of delivering the resin material to the downstream side. The reverse-feed full-flighter 52 is adjusted in terms of the helical direction of screw 52i so as to decrease the ability of delivering the resin material to the downstream side. FIG. 26 (E) and (F)

illustrate an example of the orthogonal double-start thread kneading disk 58. In the orthogonal double-start thread kneading disk 58, there are disposed paddles 58e, having apexes 58x and formed virtually as an oval disk, at an intersecting angle of 90° in series. The orthogonal double-start thread kneading disk 58 little has the ability of delivering the resin material because it is not provided with a helix angle. However, it has a high shearing ability, and accordingly has a high dispersing ability as well as a high kneading ability. FIG. 26 (G), (H) and (I) illustrate an example of the forward-feed double-start thread kneading disk 54. The forward-feed double-start thread kneading disk 54 includes paddles 54e having apexes 54x and formed virtually as an oval disk, and the apexes 54x were disposed in series in a manner slanting downward from left to right. FIG. 26 (J), (K) and (L) illustrate an example of the reverse-feed double-start thread kneading disk 56. The reverse-feed double-start thread kneading disk 56 includes paddles 56e having apexes 56x and formed virtually as an oval disk, and the apexes 56x were disposed in series in a manner slanting upward from left to right.

In particular, it is preferable to dispose a screw having a high dispersing ability and a high kneading ability, for instance, a kneading disk, immediately below the first, second and third water supply ports 1k, 1m and 1n, because the kneading disk enhances the water dispersibility and increases the contact efficiency between the resin material and the water. It is especially preferable to employ a reverse-feed kneading disk having a helix angle of from 30° to 150° or an orthogonal kneading disk for this purpose.

Second Preferred Embodiment

The Second Preferred Embodiment according to the present invention will be hereinafter described with reference to FIG. 4. Basically, a recycling apparatus employed by the Second Preferred Embodiment has the identical construction with that employed by the First Preferred Embodiment. For example, the steps carried out in the melting region 4, the degassing region 6 and the kneading region 7 are basically identical with those of the First Preferred Embodiment. However, in the Second Preferred Embodiment, the recycling apparatus employs screw arrays, which are different from those of the First Preferred Embodiment, for the hydrolysis region 5. Therefore, the hydrolysis region 5 according to the Second Preferred Embodiment will be hereinafter described in detail.

Hydrolysis Region 5

In the hydrolysis region 5 of the Second Preferred Embodiment, similarly to the First Preferred Embodiment, there are also disposed the sealing rings 10 and 11 on the most upstream side and the most downstream side, respectively, thereby keeping the pressure in the hydrolysis region 5 high. In FIG. 4, there are illustrated screw arrays 20. The screw arrays 20 are constituted by combining the orthogonal double-start thread kneading disks 58 in series, and are characterized in that the orthogonal double-start thread kneading disks 58 are disposed immediately below the first, second and third water supply ports 1k, 1m and 1n. In FIG. 4, there are also illustrated screw arrays 30. The screw arrays 30 are constituted, similarly to those of the First Preferred Embodiment, by combining the reverse-feed full-flighter 52 and the sealing ring 13. With these arrangements, the resin material are packed in the screw arrays 20 and 30, thereby forming a highly packed region where a packing efficiency of the resin material is enhanced. Thus, the pressure in the hydrolysis region 5 can be maintained at high pressures. For example, when the resin material was delivered in the amount of 50 kg per hour, the pressure was 50 to 60 kgf/cm² around the first water supply port 1k in the passage 1a.

Figure 4:
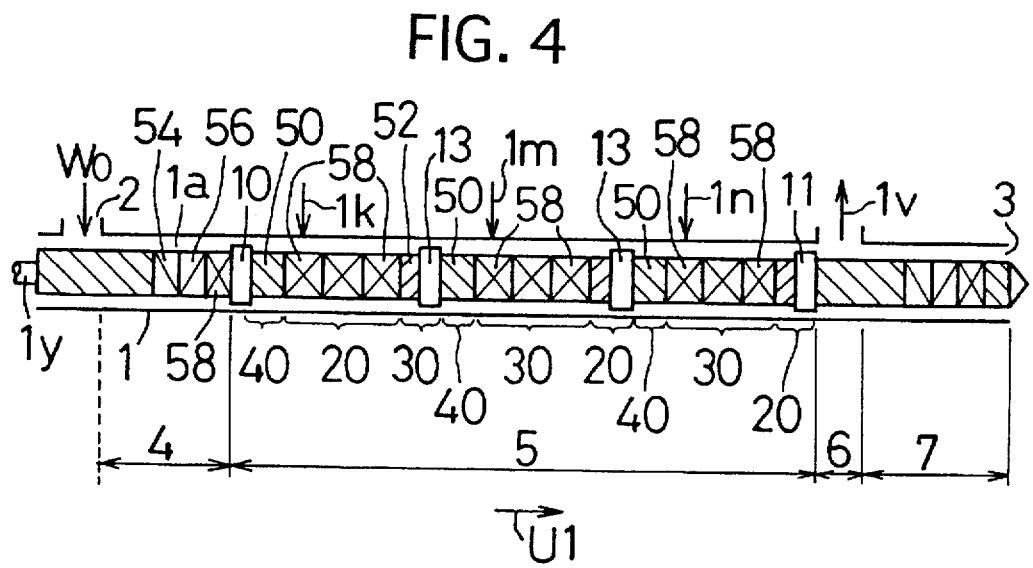
FIG. 4 is a construction diagram which schematically illustrates a recycling apparatus of a Second Preferred Embodiment according to the present invention.

Further, as can be understood from FIG. 4, there are repetitively disposed a plurality of screw array combinations in series from the upstream side to the downstream side. The screw array combinations are constituted by combining the same screw arrays 20 and 30. Furthermore, there are also disposed forward-feed full-flighters 50 (i.e., screw arrays 40) having a high delivering ability between the screw arrays 20 and thereby securely providing the capability of delivering the resin material. The water is supplied through the first water supply port 1k, the second water supply port 1m and the third water supply port 1n into the hydrolysis region 5. The supplied water is dispersed in the molten resin material by the action of the screw arrays 20 and 30. Consequently, the fine paint film pieces dispersed in the resin material can contact effectively with the liquid water or the water vapor to efficiently cause hydrolysis. The fine paint film pieces can be converted into low-molecular-weight compounds because their molecular chains are cut by the kneading action of the screw arrays 20 and 30. Hence, the paint films from the melting region 4 can be further subdivided in the hydrolysis region 5.

In the Second Preferred Embodiment, the orthogonal double-start thread kneading disks 58 are disposed immediately below the first, second and third water supply ports 1k, 1m and 1n as illustrated in FIG. 4, the water flowed in the passage 1a is believed to be dispersed in the molten resin material in fine particulate states. Accordingly, the surface area of the fine particulate liquid increases so that the contact can be carried out efficiently between the fine particulate liquid and the paint film pieces, and that the hydrolysis reaction can be facilitated. When the pressure is maintained at pressures more than the saturation vapor pressure in the cylinder 1, it is believed that the fine particulate water can be present in the resin material in a coexisting form of the liquid water and the water vapor.

Evaluation

The First and Second Preferred Embodiments produced highly refined recycled resin compositions, compared with those produced by the prior art, because the paint films were further converted into the low-molecular-weight compounds and uniformly dispersed in the recycled resin compositions by the facilitated hydrolysis reactions. Accordingly, it is possible to produce highly refined resin composition out of resin material which has not been subjected to pre-treatments.

In order to verify the advantageous effect, an embrittling temperature test, an impact test and a flowability test were carried out. Specifically speaking, the pellets produced by the First and Second Preferred Embodiments were molded into test specimens with an injection molding machine. The test specimens were examined for their embrittling temperatures, Izod impact strength values and MFR values. The embrittling temperature was measured according to ASTM D746. The Izod impact strength value was measured according to JIS K7110. The MFR value was measured according to JIS K7210. Likewise, test specimens produced by the following comparative examples, i.e., Comparative Example Nos. 1 and 2, were examined therefor.

In Comparative Example No. 1, the test specimens were made out of virgin material. In Comparative Example No. 2, the test specimens were made by a conventional batch recycling process. For instance, a cylindrical batch recycling apparatus was used in which a stirring impeller was disposed and which had a vapor supply port at one end in the longitudinal axis direction and a vapor discharge port at another end therein. The batch recycling apparatus had a diameter of 260 mm, a length of 400 mm and a recycling capacity of 7 kg resin material. The resin material were pulverized into pieces having a square shape in a size of about 5 mm×5 mm. In the batch recycling apparatus, the pulverized resin material pieces were placed in a packing efficiency of 70% by volume. While keeping the packed state, water vapor was supplied into the batch recycling apparatus at a rate of 5 kg/hour to carry out hydrolysis for 1 hour at a temperature of 160° C. under a pressure of 5.2 kgf/cm$^2$. However, note that this conventional 1-hour hydrolysis treatment time did not include the preheating time of 3 minutes and the cooling time of 3 minutes.

The results of the examinations for the physical properties of the recycled resin compositions produced by the First and Second Preferred Embodiments are set forth in Table 1 below together with those for the comparative examples, and are summarized by the relative values with respect to those of Comparative Example No. 1 taken as 100. As can be seen from Table 1, with respect to the embrittling temperature of Comparative Example No. 1 taken as 100, Comparative Example No. 2 exhibited 75 thereto, the First Preferred Embodiment exhibited 80 thereto, and the Second Preferred Embodiment exhibited 98 thereto. The Second Preferred Embodiment exhibited an especially favorable embrittling temperature. The lower the value was, the lower the recycled resin composition exhibited an embrittling temperature.

Concerning the Izod impact strength value at 23° C., Comparative Example No. 2 exhibited 96 with respect to the actually examined value for Comparative Example No. 1 (For instance, let it be 100 J/m.), the First Preferred Embodiment exhibited 91 thereto, and the Second Preferred Embodiment exhibited 96 thereto. Concerning the Izod impact strength value at −30° C., Comparative Example No. 2 exhibited 96 with respect to the actually examined value for Comparative Example No. 1 (For instance, let it be 100 J/m.), the First Preferred Embodiment exhibited 91 thereto, and the Second Preferred Embodiment exhibited 96 thereto.

Concerning the MFR value, Comparative Example No. 2 exhibited 111 with respect to the actually examined value for Comparative Example No. 1 (For instance, let it be 100 g/10 min.), the First Preferred Embodiment exhibited 106 thereto, and the Second Preferred Embodiment exhibited 100 thereto.

TABLE 1

|  | 1st Pref. Embodiment | 2nd Pref. Embodiment | Comp. Ex. No. 1 | Comp. Ex. No. 2 |
| --- | --- | --- | --- | --- |
| Recycled Amount (kg/hr.) | 50 | 50 | — | 7 |
| Water Addition Amount (PHR) | 10 | 10 | — | 71 |
| Recycling Time (min.) | 5 | 5 | — | 60 |
| Embrittling Temp.* | 80 | 98 | 100 | 75 |
| Izod Impact | 91 | 96 | 100 | 96 |

TABLE 1-continued

|  | 1st Pref. Embodiment | 2nd Pref. Embodiment | Comp. Ex. No. 1 | Comp. Ex. No. 2 |
| --- | --- | --- | --- | --- |
| Strength at 23° C.* |  |  |  |  |
| Izod Impact Strength at −30° C.* | 92 | 97 | 100 | 74 |
| MFR Value* | 106 | 100 | 100 | 111 |

(Note)
The values marked with * are the relative values with respect to those of Comparative Example No. 1 (i.e., virgin material).

Third Preferred Embodiment

Figure 5:
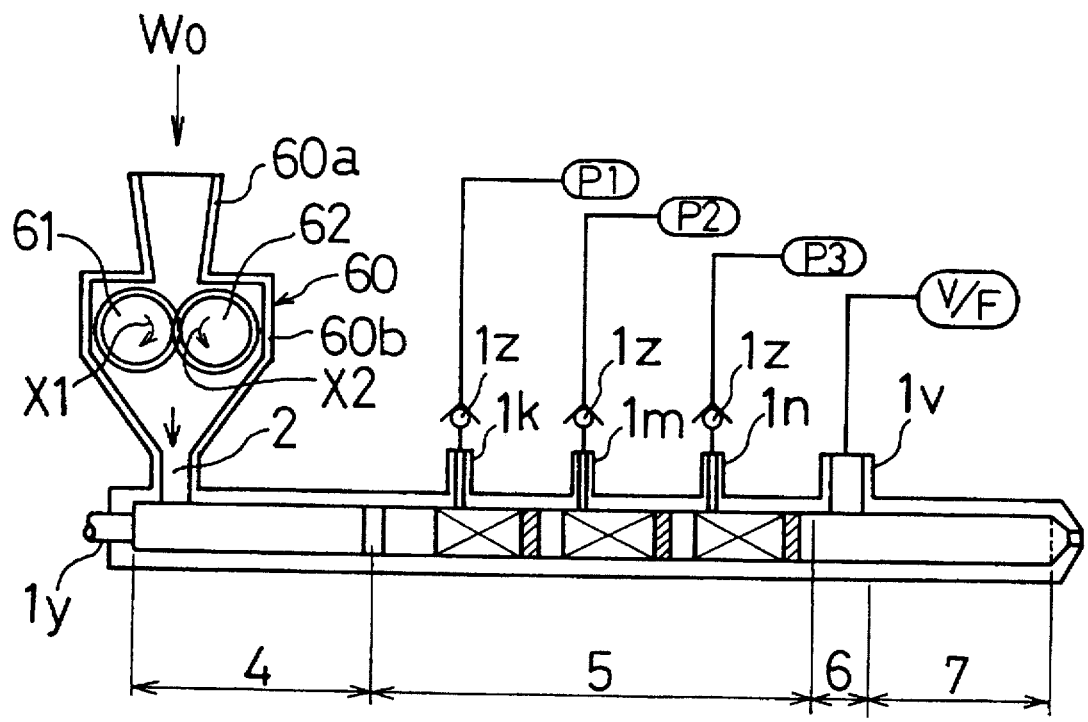
FIG. 5 is a construction diagram which schematically illustrates a recycling apparatus of a Third Preferred Embodiment according to the present invention.
Figure 6:
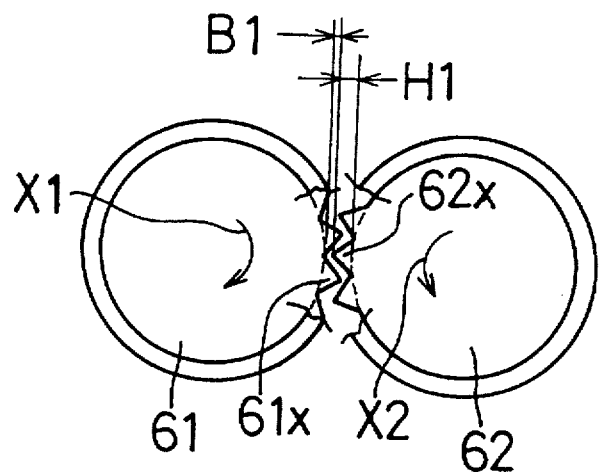
FIG. 6 is a construction diagram which schematically illustrates crack producing means of the recycling apparatus of the Third Preferred Embodiment.

The Third Preferred Embodiment according to the present invention will be hereinafter described with reference to FIGS. 5 and 6. Basically, a recycling apparatus employed by the Third Preferred Embodiment has the identical construction with that employed by the First Preferred Embodiment. As illustrated in FIG. 5, however, in the Third Preferred Embodiment, the recycling apparatus is provided with crack producing means 60 on an upstream side with respect to the melting region 4.

The crack producing means 60 includes a box-shaped base 60b provided with a hopper 60a, a first roller 61 disposed in the base 60b and held rotatably therein, and a second roller 62 held rotatably in the base 60b and facing the first roller 61. As illustrated in FIG. 6, on an outer peripheral portion of the first roller 61, there are formed a plurality of first projections 61x in a zigzag arrangement. Likewise, on an outer peripheral portion of the second roller 62, there are formed a plurality of second projections 62x in a zigzag arrangement. FIG. 6 illustrates part of the first and second projections 61x and 62x.

The first and second projections 61x and 62x can be formed as a square cone, a triangular cone, or a circular cone. The first and second projections 61x and 62x can be rotated at the same speed or different speeds each other. Let the thickness of the pulverized products $W_o$ be $t_o$ before being charged into the hopper 60a, the height H1 of the second projections 62x can be adjusted to (1 to 3) $t_o$, and the pitches of the zigzag arrangement of the second projections 62x can also be adjusted to (1 to 3) $t_o$. The first projections 61x can be adjusted similarly. The clearance B1 between the convexity and concavity of the first and second rollers 61 and 62 can be adjusted to (0.2 to 0.8) $t_o$.

In the supplying process, when the first roller 61 is rotated in the direction of the arrow X1, the second roller 62 is rotated in the direction of the arrow X2 and the resin scrap of about 5 mm×5 mm square pieces is pulverized and charged into the hopper 60a, the pulverized resin scrap pieces are compressed and extended by the first and second rollers 61 and 62. Since the thermosetting resin paint film is less likely to extend than the thermoplastic resin substrate, the cracks are likely to be produced in the paint film. The cracks are thus produced in the paint film, and accordingly the paint can be pulverized into further fine pieces and its surface area can be enlarged. As a result, the paint film can be furthermore fined in the melting region 4, and, in the hydrolysis region 5, the hydrolyzing agent and the paint film can be contacted at an enhanced efficiency. Further, in the hydrolysis region 5, the hydrolyzing agent can penetrate into the cracks. Thus, the Third Preferred Embodiment can contribute to facilitating the hydrolysis reaction, reducing the recycling time and producing highly refined recycled resin composition.

Fourth Preferred Embodiment

Figure 7:
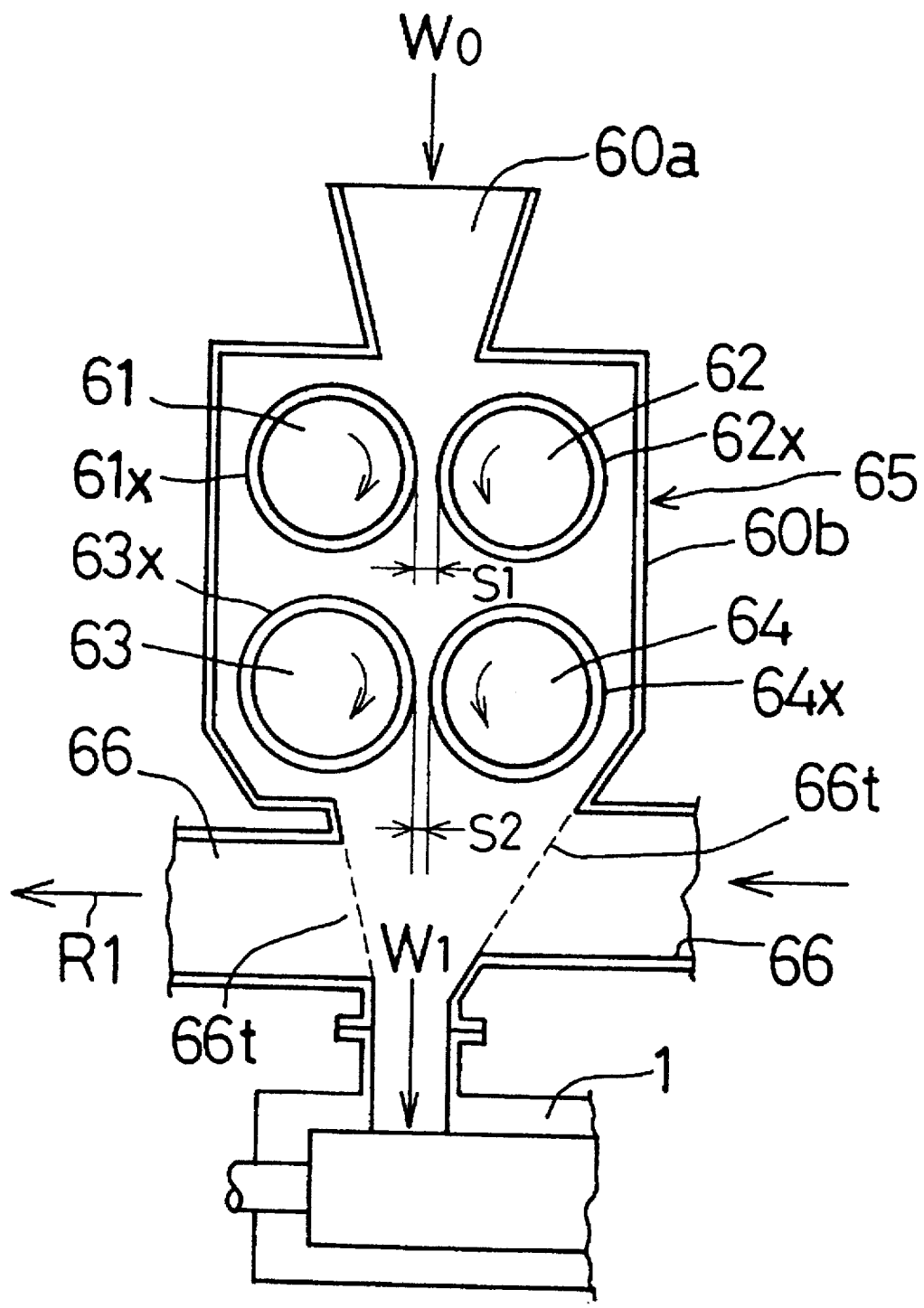
FIG. 7 is a construction diagram which schematically illustrates crack producing means of a recycling apparatus of a Fourth Preferred Embodiment according to the present invention.

The Fourth Preferred Embodiment according to the present invention will be hereinafter described with reference to FIG. 7. Basically, a recycling apparatus employed by the Fourth Preferred Embodiment has the identical construction with that employed by the Third Preferred Embodiment. However, in the Fourth Preferred Embodiment, the recycling apparatus is provided with multideck crack producing means 65. The crack producing means 65 includes a box-shaped base 60b provided with a hopper 60a, a first roller 61 and a second roller 62 which are disposed rotatably on an upper portion of the base 60b and which face each other, and a third roller 63 and a fourth roller 64 which are disposed rotatably on a lower portion of the base 60b and which face each other. Similarly to the first projections 61x, there are formed a plurality of third projections 63x in a zigzag arrangement on an outer peripheral portion of the third roller 63. Similarly to the second projections 62x, there are formed a plurality of fourth projections 62x in a zigzag arrangement on an outer peripheral portion of the fourth roller 64. The third and fourth projections 63x and 64x can be formed as a square cone, a triangular cone, or a circular cone.

The clearance S1 between the upper-side first and second rollers 61 and 62 are adjusted so as to be larger than the clearance S2 between the lower-side third and fourth rollers 63 and 64. For instance, the clearance S1 can be adjusted to (0.2 to 0.8) $t_o$, and the clearance S2 can be adjusted to (0.1 to 0.5) $t_o$. The first roller 61 can be rotated at a speed faster than the speed of the second roller 62. For example, the first roller 61 can be rotated at a speed of from 200 to 300 rpm, and the second roller 62 can be rotated at a speed of from 100 to 200 rpm. The fourth roller 64 can be rotated at a speed faster than the speed of the third roller 63. For example, the fourth roller 64 can be rotated at a speed of from 200 to 300 rpm, and the third roller 63 can be rotated at a speed of from 100 to 200 rpm.

When the resin scrap of about 5 mm×5 mm square pieces is charged into the hopper 60a, the pulverized resin scrap pieces are compressed and extended by the first, second, third and fourth rollers 61, 62, 63 and 64. In the Fourth Preferred Embodiment, the cracks are more likely to be produced. The reasons behind this advantageous effect are believed as follows. Since the speed of the first roller 61 is adjusted to be higher than that of the second roller 62, there arises a relative speed difference, the cracks are likely to be produced in the paint film facing the first roller 61 on the upper side, and the cracks are likely to be produced in the paint film facing the fourth roller 64 on the lower side.

Moreover, in the Fourth Preferred Embodiment, the crack producing means 65 is equipped with an air duct 66 which holds a filter 66t therein and which is disposed between the base 60b and the cylinder 1. By suctioning through the air duct 66 or by blowing therethrough, fine paint film pieces, which are separated from the substrate during the pulverizing and the production of cracks, can be transferred through the filter 66t along the air duct 66 in the direction of the arrow R1, and consequently they can be removed.

Fifth Preferred Embodiment

Figure 8:
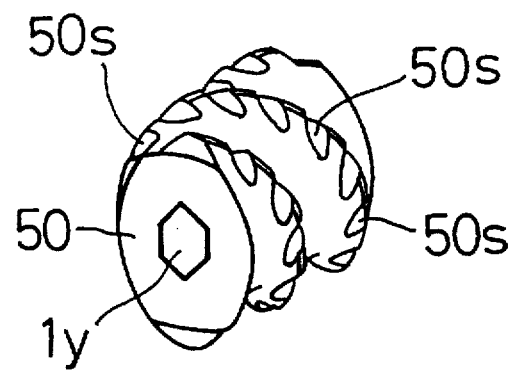
FIG. 8 is a perspective view which illustrates a major portion of a forward-feed full-flighter employed by a recycling apparatus of a Fifth Preferred Embodiment according to the present invention.

In the above-described Third and Fourth Preferred Embodiments, the cracks are produced in the paint film by the crack producing means 50 and 65 which are disposed outside the cylinder 1. However, the present invention is not limited thereto. The cracks can be produced in the paint film within the cylinder 1. For instance, as the Fifth Preferred Embodiment according to the present invention illustrated in FIG. 8, grooves 50s are formed in the screw of the forward-feed full-flighter 50. Consequently, the wall surface of the cylinder 1 and the forward-feed full-flighter 50 can apply the shearing deformation to the unmelted resin material, thereby producing the cracks in the paint film. Note that such grooves can be formed in the screw of the reverse-feed full-flighter 52.

Alternatively, there can be formed a large clearance between the apexes of the kneading disk 54, 56 and 58 and the inner wall surface of the cylinder 1. The unmelted resin material can be forcibly delivered through the clearance, thereby producing cracks in the paint film.

Sixth Preferred Embodiment

Figure 9:
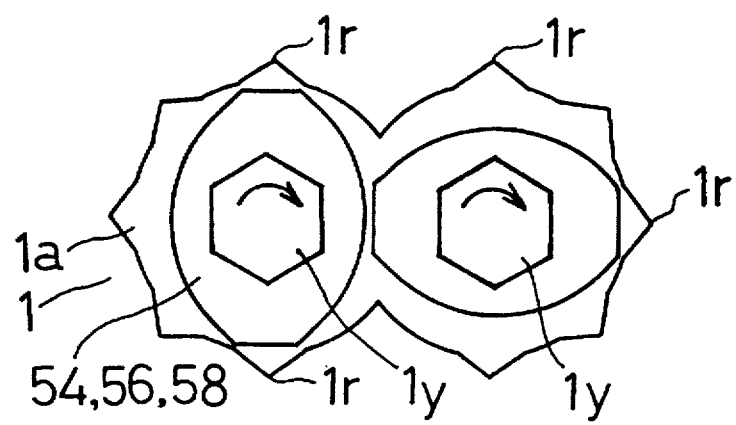
FIG. 9 is a construction diagram which schematically illustrates crack producing means of a recycling apparatus of a Sixth Preferred Embodiment according to the present invention.

Alternatively, as the Sixth Preferred Embodiment according to the present invention illustrated in FIG. 9, a plurality of grooves 1r can be formed in the inner wall surface of the cylinder 1. The unmelted resin material can be hooked at the grooves 1r, and the shearing force can be applied to the paint film by using the grooves 1r. Thus, the cracks can be produced in the paint film.

Seventh Preferred Embodiment

Figure 10:
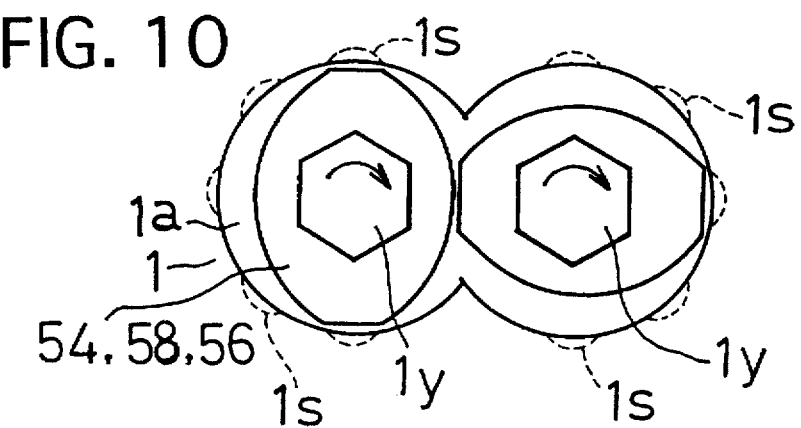
FIG. 10 is a construction diagram which schematically illustrates crack producing means of a recycling apparatus of a Seventh Preferred Embodiment according to the present invention.

Alternatively, as the Seventh Preferred Embodiment according to the present invention illustrated in FIG. 10, a plurality of dimpled holes 1s can be formed in the inner wall surface of the cylinder 1. The unmelted resin material can be hooked at the dimpled holes 1s to apply the shearing force to the paint film by using the dimpled holes 1s. Thus, the cracks can be produced in the paint film.

Eighth Preferred Embodiment

Figure 11:
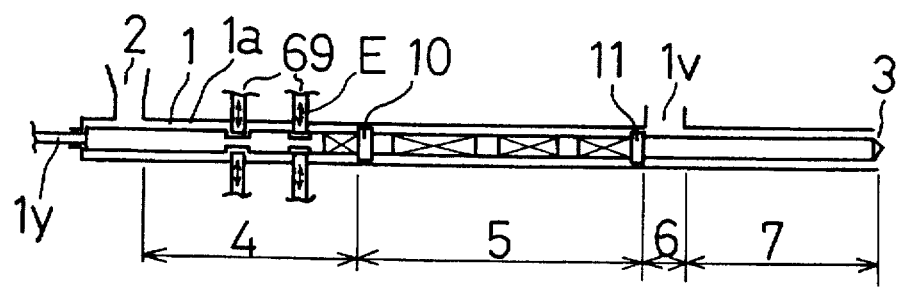
FIG. 11 is a construction diagram which schematically illustrates a recycling apparatus of an Eighth Preferred Embodiment according to the present invention together with crack producing means thereof.

Alternatively, as the Eighth Preferred Embodiment according to the present invention illustrated in FIG. 11, the cylinder 1 can be provided with slotting means 69 which can vibrate in the direction of the arrow E. The shearing force can be applied to the paint film by vibrating the slotting means 69, thereby producing the cracks in the paint film.

Ninth Preferred Embodiment

Figure 12:
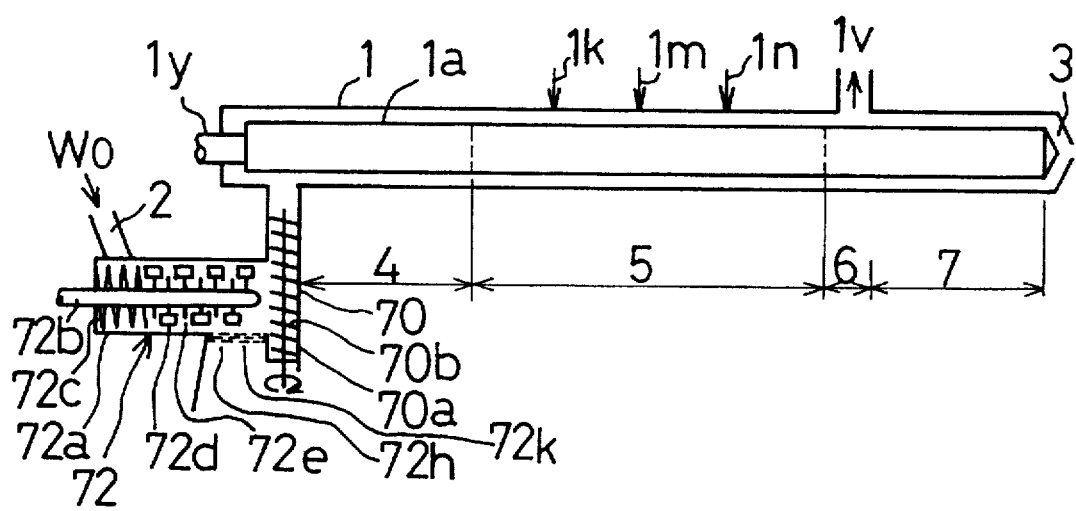
FIG. 12 is a construction diagram which schematically illustrates a recycling apparatus of a Ninth Preferred Embodiment according to the present invention together with washing means thereof.
Figure 13:
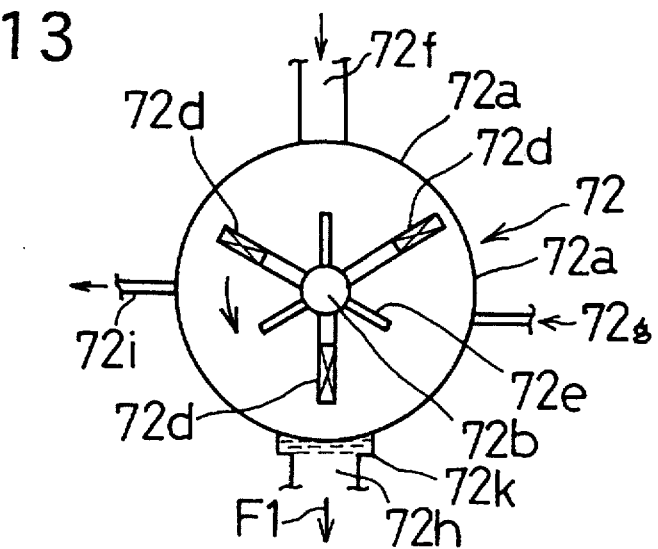
FIG. 13 is a transverse cross-sectional view which schematically illustrates a major portion of the washing means of the Ninth Preferred Embodiment.

FIGS. 12 and 13 illustrate the Ninth Preferred Embodiment according to the present invention. In the Ninth Preferred Embodiment, there is disposed an auxiliary cylinder apparatus 70 perpendicularly on an upstream side with respect to the cylinder 1. The auxiliary apparatus 70 includes an auxiliary cylinder 70a disposed under the bottom portion of the cylinder 1, an auxiliary screw 70b disposed in the auxiliary cylinder 70a and rotated by a driving motor. Further, there is disposed washing means 72 horizontally on an upstream side with respect to the auxiliary cylinder apparatus 70. The washing means 72 includes a washing cylinder 72a communicating with the auxiliary cylinder 70a and having a supply port 2, a driving shaft 72b disposed in the washing cylinder 72a and rotated by a driving motor, a screw 72c installed to the driving shaft 72b, stirring impellets 72d and 72e installed to the driving shaft 72b, washing water inlet holes 72f and 72g, washing water outlet holes 72h and 72i, and a filter 72k. The filter 72k preferably has a mesh size which does not allow the resin material to pass therethrough.

The foreign materials, such as mud, wax, tar and sand, are usually deposited on the resin scrap. In order to remove the foreign materials, in the Ninth Preferred Embodiment, the washing water is introduced into the washing cylinder 72a through the washing water inlet holes 72f and 72g, and simultaneously the driving shaft 72b is rotated. Accordingly, the resin scrap is stirred and washed by the rotary action of the stirring impellets 72d and 72e. Among the foreign materials thus washed and removed, the mud and sand having a large specific weight are transferred through the filter 72k in the direction of the arrow F1 and evacuated to the outside. The waste water containing the foreign materials having a small specific weight, e.g., the wax and tar, is evacuated to the outside through the water outlet holes 72h and 72i. In the Ninth Preferred Embodiment, it is preferred that the level of the washing water is adjusted to be from about ⅓ to ½ of the height of the washing cylinder 72a. Taking the washing efficiency into consideration, it is preferred that the packing efficiency of the resin material and the washing water is adjusted to be from about ⅓ to ½ of the accommodatable capacity of the washing cylinder 72a. The stirring impellets 72d and 72e have a different radial length each other, and are twisted in order to securely provide themselves an ability of delivering the resin material to the downstream side.

The melting region 4 is heated. Accordingly, when the washing water is transferred to the melting region 4 in a large amount, the washing water vaporizes and increases the pressure in the melting region 4. Thus, the delivery of the resin material might be troubled. In order to remove this adverse effect, in the Ninth Preferred Embodiment, the auxiliary cylinder 70a is connected at the top end to the bottom portion of the cylinder 1. Consequently, the washing water can be inhibited from going into the melting region 4, and the excessive pressure increment can be avoided in the melting region 4.

Tenth Preferred Embodiment

Figure 14:
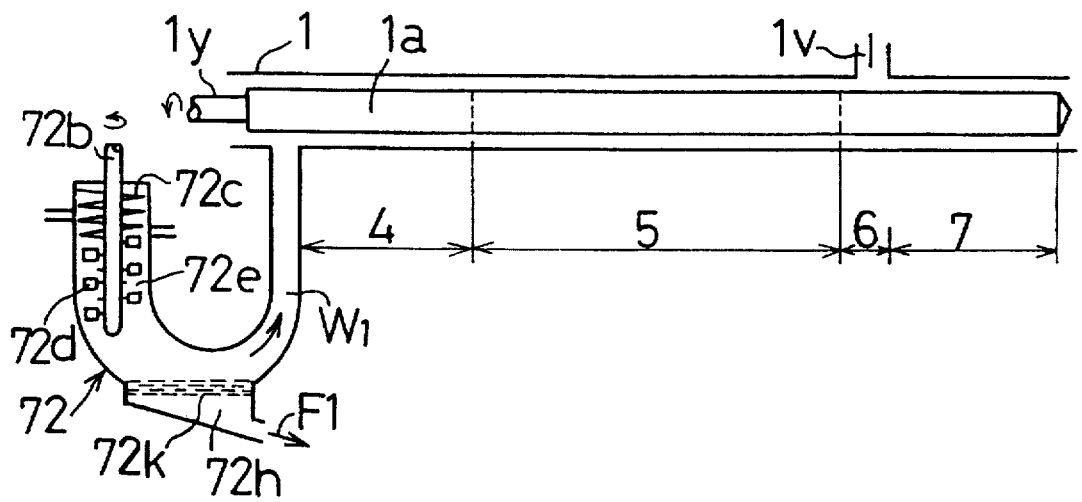
FIG. 14 is a construction diagram which schematically illustrates a recycling apparatus of a Tenth Preferred Embodiment according to the present invention together with washing means thereof.

FIG. 14 illustrates the Tenth Preferred Embodiment according to the present invention. Basically, a recycling apparatus employed by the Tenth Preferred Embodiment has the identical construction with that employed by the Ninth Preferred Embodiment, and operates and produces the advantageous effects similarly thereto. However, in the Tenth Preferred Embodiment, the washing means 72 is a vertical one, and a filter 72k is installed to an outlet hole 72h which is formed at a bottom of a letter U-shaped washing cylinder 72a.

Eleventh Preferred Embodiment

Figure 15:
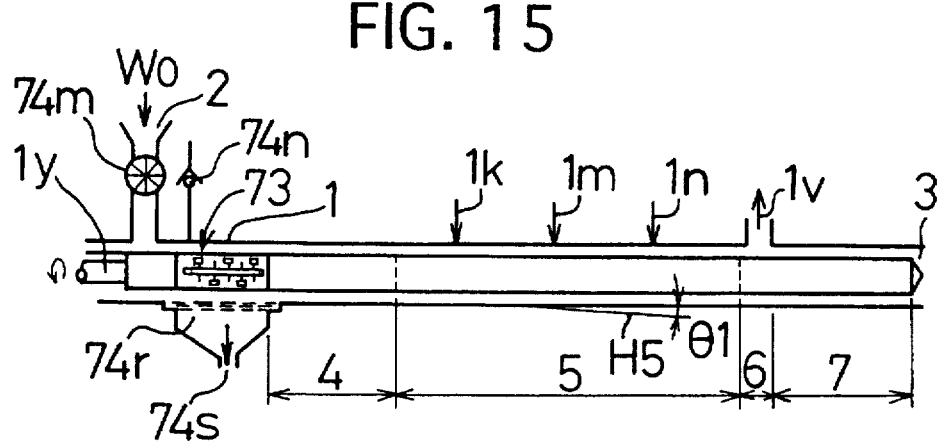
FIG. 15 is a construction diagram which schematically illustrates a recycling apparatus of an Eleventh Preferred Embodiment according to the present invention together with washing means thereof.
Figure 16:
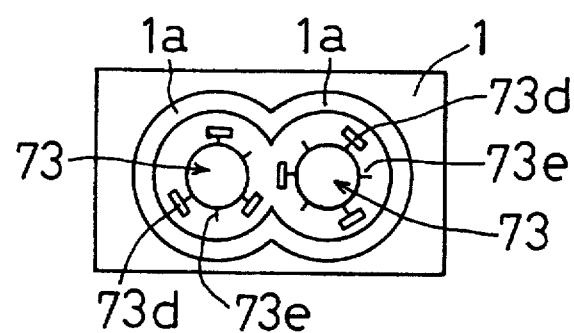
FIG. 16 is a transverse cross-sectional view which schematically illustrates a major portion of the washing means of the Eleventh Preferred Embodiment.

FIGS. 15 and 16 illustrate the Eleventh Preferred Embodiment according to the present invention. In the Eleventh Preferred Embodiment, washing means 73 includes stirring impellets 73d and 73e. The washing water is evacuated to the outside by way of a screen 74r and an outlet port 74s. Part of the washing water is delivered to the melting region 4, and is vaporized to increase the pressure therein. Hence, in order not to disturb the charging of the pulverized products $W_o$ through the supply port 2, a rotary valve 74m having a sealing ability and a delivering ability is disposed below the supply port 2, thereby making the supply of the pulverized products $W_o$ easier. A check valve 74n helps stably supply the washing water. In addition, in the Eleventh Preferred Embodiment, in order to inhibit the washing water from going into the melting region 4, the cylinder 1 is inclined upward from left to right in the drawing at an angle $\Theta 1$ (e.g., from 3 to 7 degrees) with respect to the imaginary horizontal line H5 so that the discharge port 3 of the cylinder 1 faces upward.

Twelfth Preferred Embodiment

Figure 17:
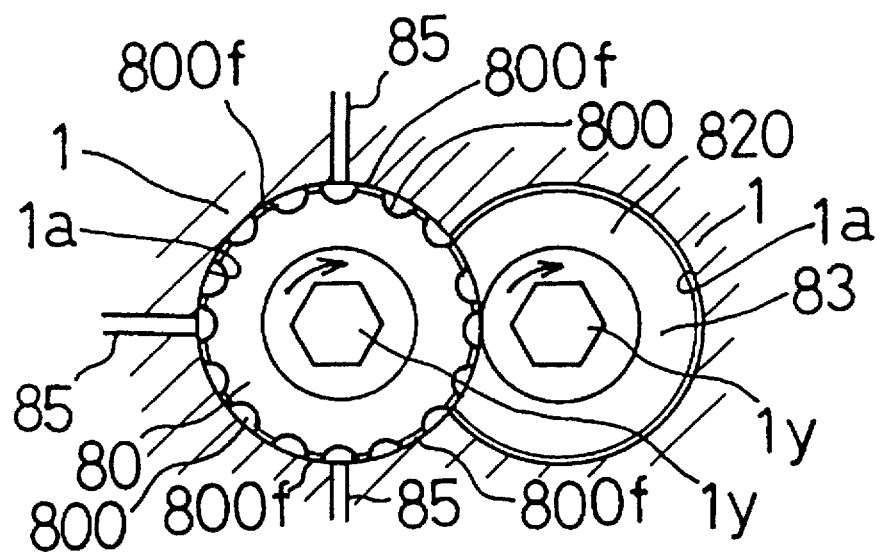
FIG. 17 is a transverse cross-sectional view which schematically illustrates portions around a sealing ring employed by a recycling apparatus of a Twelfth Preferred Embodiment according to the present invention.
Figure 18:
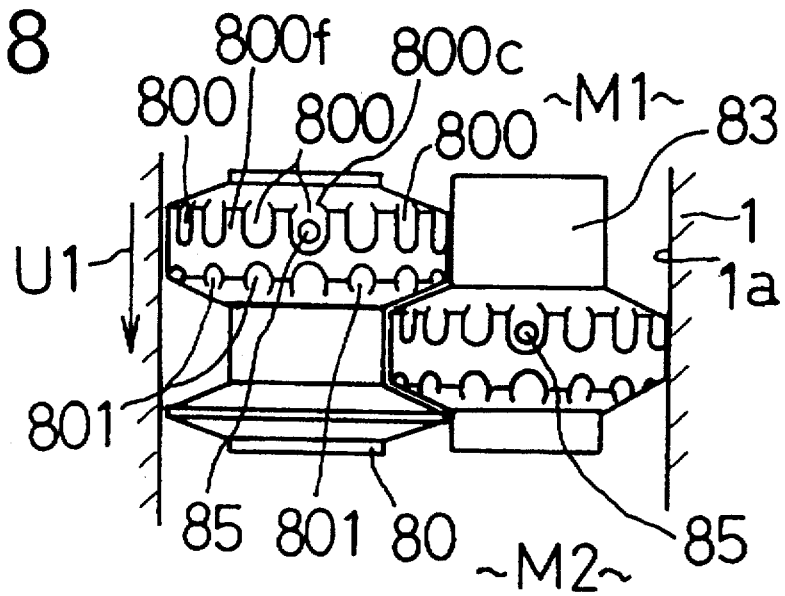
FIG. 18 is a plan view which schematically illustrates portions around the sealing ring employed by the recycling apparatus of the Twelfth Preferred Embodiment.

The Twelfth Preferred Embodiment according to the present invention will be hereinafter described with reference to FIGS. 17 through 20. As illustrated in FIG. 17, in the passage 1a of the double-axis cylinder 1, there are disposed sealing rings 80 and 83 operating as the present resistor. The sealing rings 80 and 83 are rotated by driving shafts 1y connected to a driving motor. Virtually on all over the outer peripheral portion of the sealing ring 80, there are formed a plurality of grooves 800 and grooves 801 which face each other and are lined up in the circumferential direction. As can be understood from FIGS. 19 and 20, there are formed expanded portions 80r at the boundary between the grooves 800 and the grooves 801 so as not to communicate the grooves 800 and the grooves 801 in the axial direction. A water supply port 85 is formed so as to be capable of facing the grooves 800 of the sealing ring 80. Therefore, as can be appreciated from FIG. 17, when the sealing ring 80 is rotated in the circumferential direction, the water supply port 85 first faces one of the grooves 800, and faces one of outer peripheral portions 800f between the grooves 800, and then faces the next one of the grooves 800. This operation is carried out repeatedly. When the water supply port 85 faces the grooves 800, the hydrolyzing agent is supplied to the passage 1a through the water supply port 85. When the water supply port 85 faces the outer peripheral portions 800f, the hydrolyzing agent supplied through the water supply port 85 is shut off or it is restricted considerably. Therefore, the hydrolyzing agent supplied continuously through the water supply port 85 is subdivided. For instance, it is dispersed as fine bubbles. Consequently, the contact efficiency can be improved between the hydrolyzing agent and the resin material, and the hydrolysis reaction can be facilitated.

Figure 19:
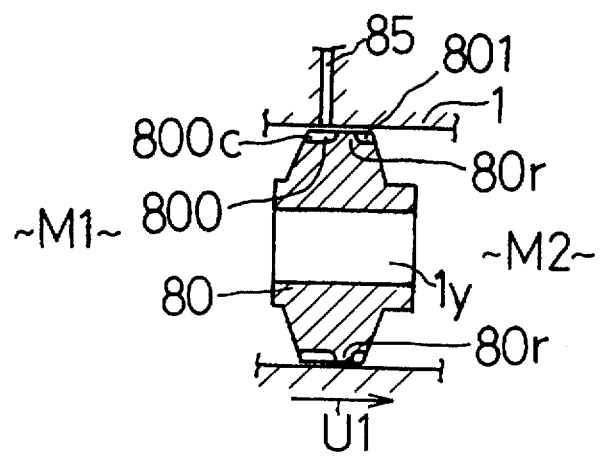
FIG. 19 is a cross-sectional view which schematically illustrates portions around the sealing ring employed by the recycling apparatus of the Twelfth Preferred Embodiment.
Figure 20:
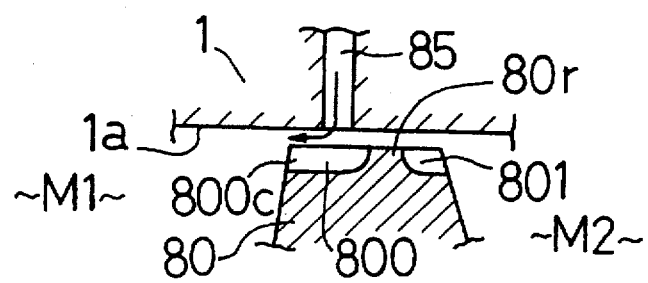
FIG. 20 is an enlarged cross-sectional view which schematically illustrates major portions of FIG. 19.

In the Twelfth Preferred Embodiment, as illustrated in FIGS. 19 and 20, the hydrolyzing agent is received by the grooves 800 whose opening 800c faces the upstream side M1, and accordingly it is likely to flow to the upstream side M1. On the other hand, the resin material flows from the upstream side M1 to the downstream side M2 in the direction of the arrow U1. Thus, the flow direction of the hydrolyzing agent is opposite to that of the resin material, and is likely to be a turbulent flow. As a result, the contact efficiency can be improved between the hydrolyzing agent and the resin material, and the hydrolysis reaction can be facilitated. When the facilitated hydrolysis reaction can be thus expected, it is possible to highly refine the recycled resin composition. Further, since it is also possible to reduce the length of the hydrolysis region 5, the axial length of the cylinder 1 can be reduced and accordingly the whole recycling apparatus can be down-sized advantageously.

Thirteenth Preferred Embodiment

Figure 21:
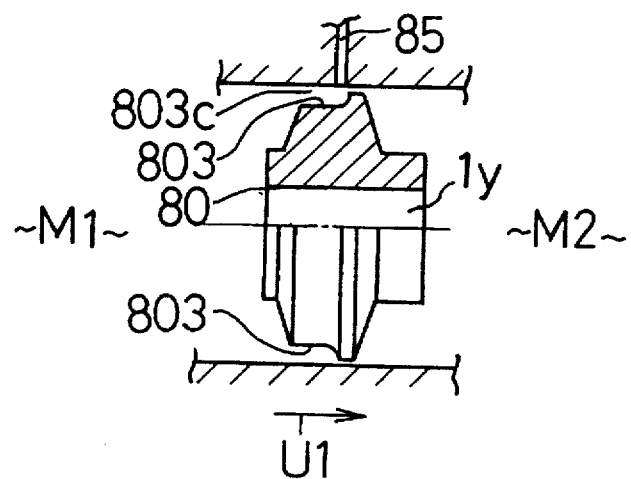
FIG. 21 is a side view which schematically illustrates portions around a sealing ring employed by a recycling apparatus of a Thirteenth Preferred Embodiment according to the present invention, and in which the upper half of the portions is illustrated in cross-section.

In the Thirteenth Preferred Embodiment illustrated in FIG. 21, there is formed a ring-shaped groove 803 continuously in the circumferential direction in the outer peripheral portion of the sealing ring 80. An opening 803c of the ring-shaped groove 803 is positioned on an upstream side M1, and accordingly the hydrolyzing agent is likely to flow to the upstream side M1 as described above. Thus, the flow direction of the hydrolyzing agent is opposite to that of the resin material, and consequently the hydrolyzing agent and the resin material are likely to collide with each other like a turbulent flow. As a result, the contact efficiency can be improved between the hydrolyzing agent and the resin material, and the hydrolysis reaction can be facilitated.

Fourteenth Preferred Embodiment

Figure 22:
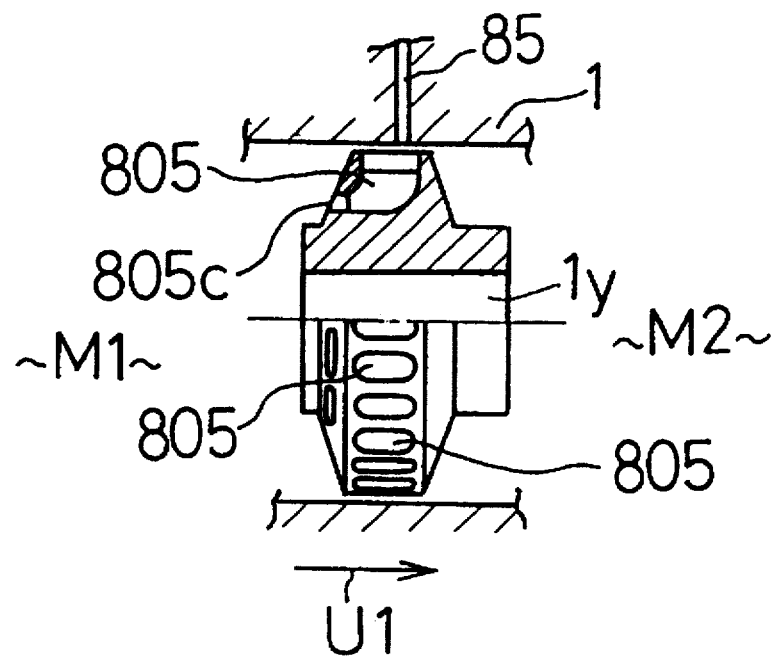
FIG. 22 is a side view which schematically illustrates portions around a sealing ring employed by a recycling apparatus of a Fourteenth Preferred Embodiment according to the present invention, and in which the upper half of the portions is illustrated in cross-section.

In the Fourteenth Preferred Embodiment illustrated in FIG. 22, there are formed a plurality of minor holes 805, facing the water supply port 85, in the outer peripheral portion of the sealing ring 80. The minor holes 805 have an opening 805c which faces an upstream side M1, and accordingly the hydrolyzing agent is likely to flow to the upstream side M1. Thus, the flow direction of the hydrolyzing agent is opposite to that of the resin material, and is likely to be a turbulent flow. As a result, the contact efficiency can be improved between the hydrolyzing agent and the resin material, and the hydrolysis reaction can be facilitated.

Fifteenth Preferred Embodiment

Figure 23:
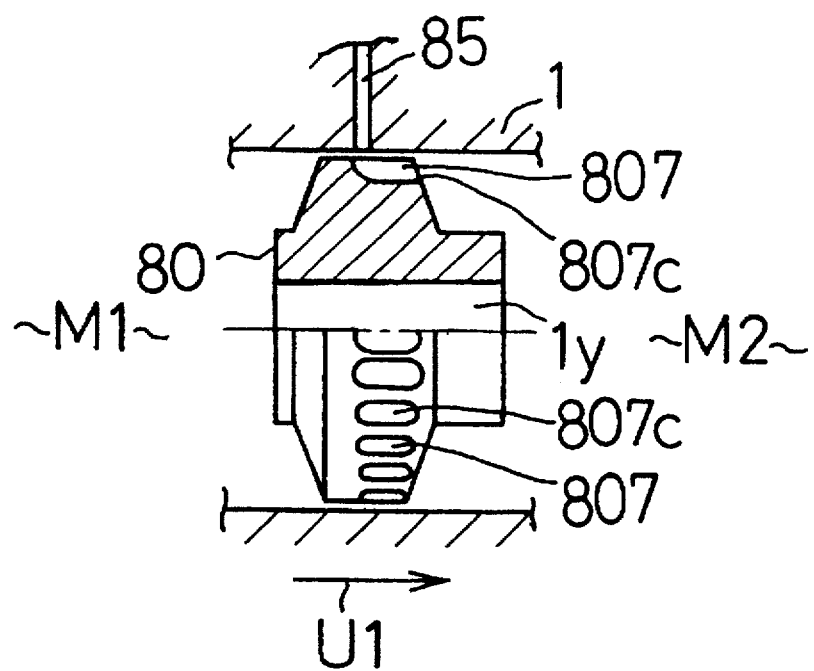
FIG. 23 is a side view which schematically illustrates portions around a sealing ring employed by a recycling apparatus of a Fifteenth Preferred Embodiment according to the present invention, and in which the upper half of the portions is illustrated in cross-section.

FIG. 23 illustrates the Fifteenth Preferred Embodiment according to the present invention. In the Fifteenth Preferred Embodiment, there are formed a plurality of grooves 807 lined up in the circumferential direction in the outer peripheral portion. The water supply port 85 is formed at a position where it can face the grooves 807 formed in the outer peripheral portion of the sealing ring 80. The sealing ring 80 rotates, and, as aforementioned, finely subdivides the hydrolyzing agent which is supplied continuously through the water supply port 85. As a result, the hydrolysis reaction can be facilitated. Note that, in the Fifteenth Preferred Embodiment, an opening 807c of the grooves 807, receiving the hydrolyzing agent, faces a downstream side M2.

Sixteenth Preferred Embodiment

Figure 24:
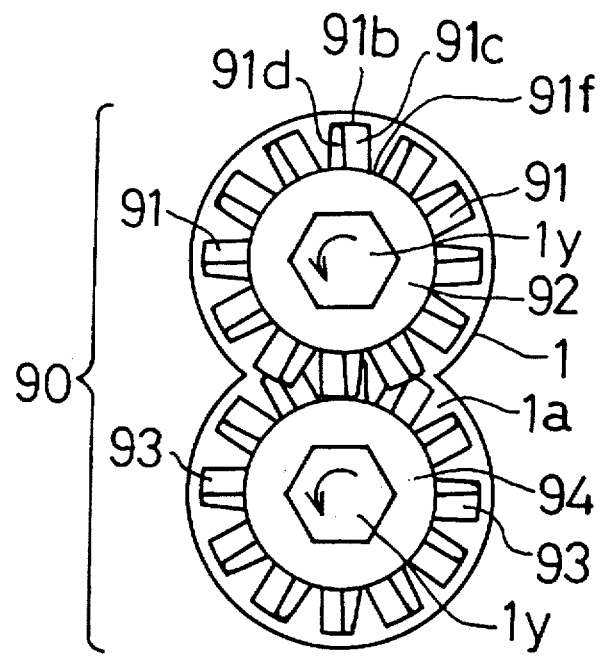
FIG. 24 is a front view which schematically illustrates a gear kneader employed by a recycling apparatus of a Six-teenth Preferred Embodiment according to the present invention, and which is viewed in the direction of the arrow "24" of FIG. 25.
Figure 25:
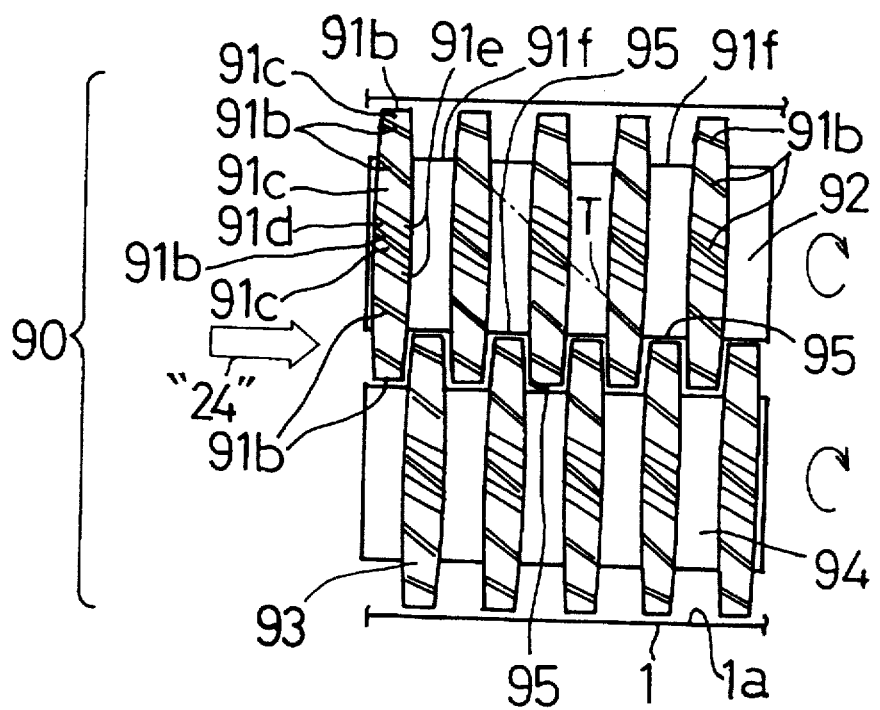
FIG. 25 is a side view which schematically illustrates the gear kneader employed by the recycling apparatus of the Sixteenth Preferred Embodiment.
Figure 26A:
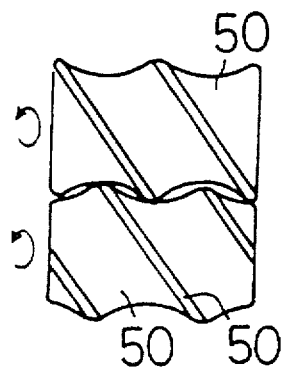
FIG. 26 illustrates construction diagrams of screws which can be employed by the present invention.
Figure 26B:
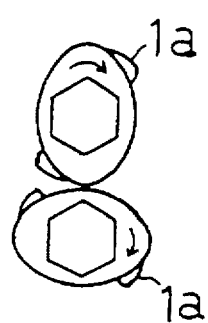
Figure 26C:
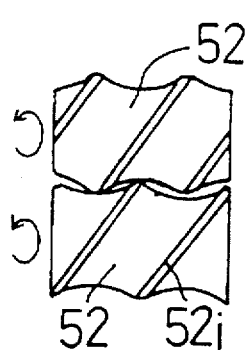
Figure 26D:
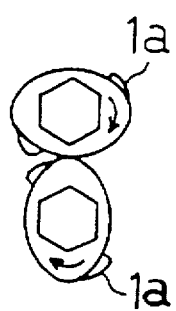
Figure 26E:
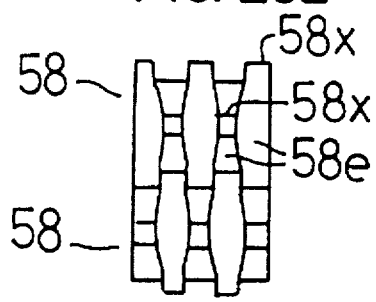
Figure 26F:
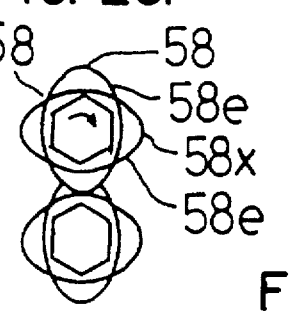
Figure 26G:
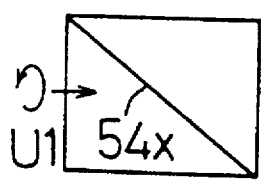
Figure 26H:
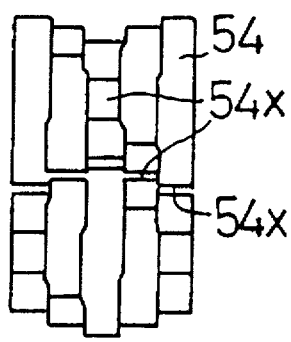
Figure 26I:
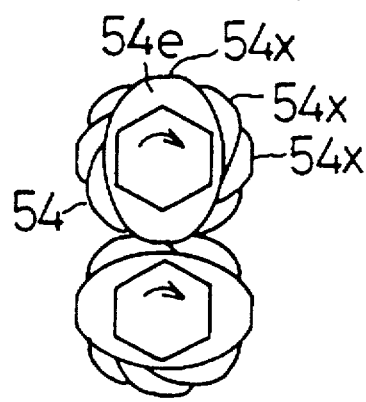
Figure 26J:
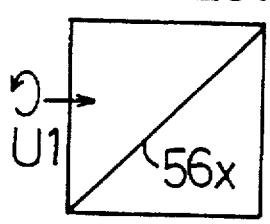
Figure 26K:
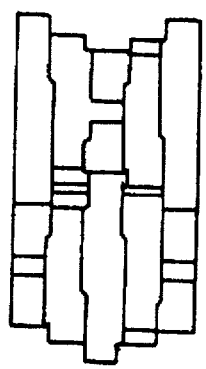
Figure 26L:
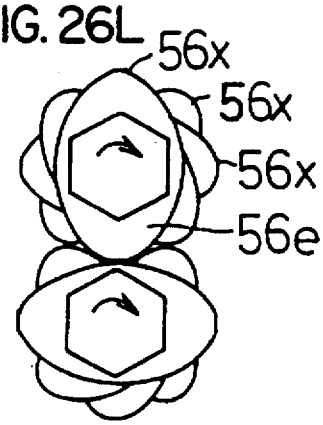

In the above-described preferred embodiments, the kneading disks are employed to constitute the screw arrays. However, a gear kneader can substitute the kneading disks to constitute the screw arrays. Namely, in the Sixteenth Preferred Embodiment according to the present invention illustrated in FIGS. 24 and 25, a gear kneader 90 substitutes aforementioned kneading disks to constitute the screw arrays. In FIG. 24, the gear kneader 90 is viewed in the direction of the arrow "24" of FIG. 25 (i.e., in the resin material delivery direction). The gear kneader 90 includes a first rotor 92 provided with a plurality of gear teeth 91 on the outer peripheral portion, and a second rotor 94 provided with a plurality of gear teeth 93 on the outer peripheral portion. As illustrated in FIG. 25, between the gear teeth 91 of the first rotor 92 neighboring in the longitudinal axis direction, there are disposed the gear teeth 93 of the second rotor 94.

The first gear teeth 91 include an apex 91b having a predetermined helix angle (or lead), opposing surfaces 91c and 91d with the apex 91b interposed therebetween and facing each other with their rear surfaces, connecting surfaces 91e, and cylindrical outer peripheral surfaces 91f. When the apexes 91b are interconnected in the longitudinal axis direction, there arises a lead T as defined by the imaginary line of FIG. 25. The first rotor 92 rotates in the direction of the arrow of FIG. 25, and accordingly the ability of delivering the resin material in the direction of the arrow "24" of FIG. 25 can be securely produced by the helix angle of the opposing surfaces 91d.

The second rotor 94 has basically the same construction as that of the first rotor 91, and accordingly the second gear teeth 93 of the second rotor 94 have basically the same construction as that of the first gear teeth 91 of the first rotor 92.

There are formed clearances 95 between the first gear teeth 91 and the second gear teeth 93. The clearances 95 are formed as a letter "U" shape or an inverted letter "U" shape, and are disposed continuously in the direction of the arrow "24" of FIG. 25 (i.e., in the resin material delivery direction), thereby securely producing a kneading capability and a dispersing capability. Moreover, it is preferable to dispose the gear kneader 90 immediately below the first, second and third water supply ports 1k, 1m and 1n, because this arrangement can advantageously improve the efficiency of the hydrolysis.

In addition, note that the clearances 95 of the gear kneader 90 are so small that they increase the resistance against the delivery of the resin material. Thus, the gear kneader 90 can also operate as the present resistor which restricts the delivery of the resin material. Therefore, it is preferable to dispose the gear kneader 90 at positions in the hydrolysis region 5 where the highly packed region is formed.

Modified Versions

The present recycling process and apparatus are not limited to the preferred embodiments described above and illustrated in the drawings, but can be accomplished by appropriately modifying them depending on requirements. For example, it is possible to effectively determine, depending on applications, the screw arrays disposed in the passage 1a of the cylinder 1, the helix angle, the pitch, the L/D, and the number of the screws and paddles. Further, in the aforementioned preferred embodiments, the present recycling process and apparatus are applied to the double-axis screw extrusion apparatus. However, they can be applied not only thereto, but also to a single-axis screw extrusion apparatus and the other multi-axis extrusion apparatus, such as a triple-axis or quadruple-axis screw extrusion apparatus.

Having now fully described the present invention, it will be apparent to one of ordinary skill in the art that many changes and modifications can be made thereto without departing from the spirit or scope of the present invention as set forth herein including the appended claims.

What is claimed is:

1. A process for recycling
   scrap resin material comprising a hydrolyzable thermosetting resin and a thermoplastic resin as its major components in apparatus having an upstream side and a downstream side and comprising a cylinder including a passage extending from the upstream side to the downstream side, at least part of the passage defining a hydrolysis region, and means for delivering the resin material from the upstream side to the downstream side, the delivering means being disposed in the passage and including resistor means disposed therein so as to restrict the delivery of the resin material to the downstream side in the hydrolysis region to form a highly packed region where a packing efficiency of the resin material is enhanced on an upstream side of the resistor means, which process comprises the steps of:
   introducing the resin scrap, into the upstream side of the passage;
   melting the thermoplastic resin of the resin material while delivering the introduced resin material from the upstream side to the downstream side;

introducing into the hydrolysis region a hydrolyzing agent effective to hydrolyze the thermosetting resin and hydrolyzing the thermosetting resin by contacting the resin material containing melted thermoplastic resin with the hydrolyzing agent;

resulting from the thermosetting resin;

restricting the delivery of the resin material to the downstream side in the hydrolysis region so as to improve a contact efficiency between the resin material and the hydrolyzing agent in the hydrolyzing step; and vaporizing water resulting from the hydrolysis of the thermosetting resin.

2. The process according to claim 1, wherein said resin material is hydrolyzed under a pressure of from 10 to 100 kgf/cm$^2$ at a temperature of the resin material from 180° to 280° C.

3. The processing according to claim 1, wherein said resistor means includes a plurality of resistors disposed in series at predetermined intervals in said passage, and said cylinder includes a plurality of supply ports, each disposed on an upstream side of one of said resistors, for supplying said hydrolyzing agent to said passage, and said hydrolyzing agent is supplied to said passage through each of the supply ports.

4. The process according to claim 3, wherein said hydrolyzing agent is supplied in a larger amount to said passage through said supply ports which are disposed on the upstream side of the passage than through said supply ports which are disposed on the downstream side of the passage.

5. The process according to claim 4, the plurality of supply ports comprises a first supply port, a second supply port and a third supply port, the supply ports being disposed in series in this order from the upstream side to the downstream side of said passage, and said hydrolyzing agent is supplied in a larger amount to said passage through the first supply port than through the second supply port, and it is supplied in a larger amount to said passage through the second supply port than through the third supply port.

6. The process according claim 1, wherein said hydrolyzing agent is water, and the water is added to the passage in an amount of from 5 to 40 parts by weight with respect to 100 parts by weight of said resin material.

7. The process according to claim 1, wherein longitudinally axial ends of said hydrolysis region are defined by said resistor means.

8. The process according to claim 1, wherein said hydrolysis region is constituted by, at least, a first hydrolysis region, a second hydrolysis region and a third hydrolysis region which are disposed in series from the upstream side to the downstream side.

9. The process according to claim 8, wherein said first, second and third hydrolysis regions are defined by an upstream-side resistor, disposed on an upstream side thereof, and a downstream-side resistor, disposed on a downstream side thereof.

10. The process according to claim 1, wherein said resistor means is constituted by at least one sealing ring which substantially covers a flow passage area of said passage and which restricts the delivery of said resin material, and at least one reverse-feed full-flighter which is disposed adjacent to and on an upstream side with respect to the sealing ring.

11. The process according to claim 1, wherein said thermoplastic resin is at least one member selected from the group consisting of polypropylene, polypropylene modified with elastomer, polyethylene, ABS resin, AS resin, polyamide resin, polyester resin, polycarbonate resin and polyacetal resin, and said thermosetting resin is a paint film comprising at least one member selected from the group consisting of acrylics-melamine resin, alkyd-melamine resin and polyurethane resin.

* * * * *